(12) United States Patent
Lindsay et al.

(10) Patent No.: US 7,948,381 B2
(45) Date of Patent: May 24, 2011

(54) REVERSIBLY DEACTIVATING A RADIO FREQUENCY IDENTIFICATION DATA TAG

(75) Inventors: Jeffrey Dean Lindsay, Appleton, WI (US); Herb Flores Velazquez, Neenah, WI (US); Fung-Jou Chen, Appleton, WI (US); Eric Francis Wagner, Cary, NC (US); John Christian Onderko, Appleton, WI (US)

(73) Assignee: Binforma Group Limited Liability Company, Dover, DE (US)

( * ) Notice: Subject to any disclaimer, the term of this patent is extended or adjusted under 35 U.S.C. 154(b) by 606 days.

(21) Appl. No.: 11/613,127

(22) Filed: Dec. 19, 2006

(65) Prior Publication Data

US 2007/0152829 A1    Jul. 5, 2007

Related U.S. Application Data

(63) Continuation-in-part of application No. 10/836,023, filed on Apr. 30, 2004, now Pat. No. 7,151,455.

(51) Int. Cl.
   *G08B 13/14* (2006.01)

(52) U.S. Cl. ............. 340/572.3; 340/539.11; 340/572.8; 340/573.1; 340/668

(58) Field of Classification Search ............... 340/572.1, 340/572.3, 572.8, 10.1, 539.11, 665, 668, 340/573.1
See application file for complete search history.

(56) References Cited

U.S. PATENT DOCUMENTS

| | | | |
|---|---|---|---|
| 4,442,507 A | 4/1984 | Roesner | |
| 4,796,074 A | 1/1989 | Roesner | |
| 5,095,362 A | 3/1992 | Roesner | |
| 5,296,722 A | 3/1994 | Potash et al. | |
| 5,315,289 A * | 5/1994 | Fuller et al. | 340/573.1 |
| 5,347,274 A | 9/1994 | Hassett | |
| 5,347,280 A | 9/1994 | Schuermann | |
| 5,360,941 A | 11/1994 | Roes | |
| 5,378,880 A | 1/1995 | Eberhardt | |
| 5,402,104 A * | 3/1995 | LaRosa | 340/539.23 |
| 5,407,851 A | 4/1995 | Roesner | |
| 5,461,385 A | 10/1995 | Armstrong | |
| 5,491,483 A | 2/1996 | D'Hont | |
| 5,521,601 A | 5/1996 | Kandlur et al. | |
| 5,528,222 A | 6/1996 | Moskowitz et al. | |
| 5,530,702 A | 6/1996 | Palmer et al. | |
| 5,541,604 A | 7/1996 | Meier | |
| 5,550,547 A | 8/1996 | Chan et al. | |

(Continued)

FOREIGN PATENT DOCUMENTS

AO     02077939 A1    10/2002

(Continued)

OTHER PUBLICATIONS

Ashton, "Embedding the Internet in Everyday Products", The X Internet: The Next Voyage available at http://www.forrester.com/Events/Speech/0,5179,309-783-aios,00.html, Nov. 2001, 2 pages, Forrester Research, Inc., USA.

(Continued)

*Primary Examiner* — Thomas J Mullen

(74) *Attorney, Agent, or Firm* — Perkins Coie LLP

(57) ABSTRACT

Reversibly activating or deactivating a radio frequency identification (RFID) data tag comprising a circuit responsive to an environmental factor. An RFID tag includes an RFID chip for storing an RFID code, an antenna for communicating a radio frequency (RF) signal, and an environmentally sensitive switch.

14 Claims, 9 Drawing Sheets

U.S. PATENT DOCUMENTS

| | | | |
|---|---|---|---|
| 5,565,846 | A | 10/1996 | Geiszler et al. |
| 5,625,341 | A | 4/1997 | Giles et al. |
| 5,680,106 | A | 10/1997 | Schrott et al. |
| 5,682,143 | A | 10/1997 | Brady et al. |
| 5,764,138 | A | 6/1998 | Lowe |
| 5,796,341 | A * | 8/1998 | Stratiotis .................. 340/573.1 |
| 5,798,694 | A | 8/1998 | Reber et al. |
| 5,822,714 | A | 10/1998 | Cato |
| 5,926,110 | A | 7/1999 | Downs et al. |
| 5,990,794 | A | 11/1999 | Alicot et al. |
| 6,069,564 | A | 5/2000 | Hatano et al. |
| 6,084,530 | A | 7/2000 | Pidwerbetsky et al. |
| 6,094,173 | A | 7/2000 | Nylander |
| 6,121,544 | A | 9/2000 | Petsinger |
| 6,169,483 | B1 | 1/2001 | Ghaffari et al. |
| 6,176,425 | B1 | 1/2001 | Harrison et al. |
| 6,201,474 | B1 | 3/2001 | Brady et al. |
| 6,204,764 | B1 | 3/2001 | Maloney |
| 6,226,619 | B1 | 5/2001 | Halperin et al. |
| 6,285,282 | B1 | 9/2001 | Dorenbosch et al. |
| 6,294,997 | B1 | 9/2001 | Paratore et al. |
| 6,294,999 | B1 | 9/2001 | Yarin et al. |
| 6,340,932 | B1 | 1/2002 | Rodgers et al. |
| 6,342,830 | B1 | 1/2002 | Want et al. |
| 6,456,239 | B1 | 9/2002 | Werb et al. |
| 6,507,279 | B2 | 1/2003 | Loof |
| 6,600,418 | B2 | 7/2003 | Francis et al. |
| 6,661,335 | B1 | 12/2003 | Seal |
| 6,662,642 | B2 | 12/2003 | Breed et al. |
| 6,672,512 | B2 | 1/2004 | Bridgelall |
| 6,680,702 | B2 | 1/2004 | Yde-Andersen et al. |
| 6,693,538 | B2 | 2/2004 | Maloney |
| 6,696,954 | B2 | 2/2004 | Chung |
| 6,703,935 | B1 | 3/2004 | Chung et al. |
| 6,714,121 | B1 | 3/2004 | Moore |
| 6,759,959 | B2 | 7/2004 | Wildman |
| 6,809,645 | B1 | 10/2004 | Mason |
| 6,853,303 | B2 * | 2/2005 | Chen et al. .................. 340/573.1 |
| 7,009,517 | B2 | 3/2006 | Wood |
| 7,136,721 | B2 | 11/2006 | Sano et al. |
| 2001/0013830 | A1 | 8/2001 | Garber et al. |
| 2002/0067264 | A1 | 6/2002 | Soehnlen |
| 2002/0067267 | A1 | 6/2002 | Kirkham |
| 2002/0109636 | A1 | 8/2002 | Johnson et al. |
| 2002/0149468 | A1 | 10/2002 | Carrender et al. |
| 2002/0152605 | A1 | 10/2002 | Debraal |
| 2002/0161652 | A1 | 10/2002 | Paullin et al. |
| 2002/0188259 | A1 | 12/2002 | Hickle et al. |
| 2002/0196150 | A1 | 12/2002 | Wildman |
| 2003/0031819 | A1 | 2/2003 | Adams et al. |
| 2003/0090388 | A1 | 5/2003 | Pomes |
| 2003/0099158 | A1 | 5/2003 | De la Huerga |
| 2003/0111540 | A1 | 6/2003 | Hartmann |
| 2003/0116634 | A1 | 6/2003 | Tanaka |
| 2003/0122655 | A1 | 7/2003 | Hum et al. |
| 2003/0155415 | A1 | 8/2003 | Markham et al. |
| 2004/0001568 | A1 | 1/2004 | Impson et al. |
| 2004/0036595 | A1 | 2/2004 | Kenny et al. |
| 2004/0041709 | A1 | 3/2004 | Forster |
| 2004/0049428 | A1 | 3/2004 | Soehnlen et al. |
| 2004/0058453 | A1 | 3/2004 | Free et al. |
| 2004/0060976 | A1 | 4/2004 | Blazey et al. |
| 2004/0066296 | A1 | 4/2004 | Atherton |
| 2004/0129781 | A1 | 7/2004 | Kreiner et al. |
| 2004/0133484 | A1 | 7/2004 | Kreiner et al. |
| 2004/0195308 | A1 | 10/2004 | Wagner et al. |
| 2004/0195309 | A1 | 10/2004 | Wagner et al. |
| 2004/0199401 | A1 | 10/2004 | Wagner et al. |
| 2004/0199545 | A1 | 10/2004 | Wagner et al. |
| 2004/0223481 | A1 | 11/2004 | Juels et al. |
| 2004/0250004 | A1 | 12/2004 | Wildman |
| 2005/0029149 | A1 | 2/2005 | Leung et al. |
| 2005/0051624 | A1 | 3/2005 | Kipp et al. |
| 2005/0114154 | A1 * | 5/2005 | Wolkowicz et al. .............. 705/1 |
| 2005/0116021 | A1 | 6/2005 | O'Dougherty et al. |
| 2005/0162277 | A1 | 7/2005 | Teplitxky et al. |
| 2005/0171738 | A1 | 8/2005 | Kadaba |
| 2005/0242950 | A1 * | 11/2005 | Lindsay et al. .......... 340/539.26 |
| 2005/0242957 | A1 | 11/2005 | Lindsay et al. |
| 2006/0001827 | A1 * | 1/2006 | Howell et al. .................. 351/41 |
| 2006/0087407 | A1 | 4/2006 | Stewart et al. |
| 2007/0200684 | A1 * | 8/2007 | Colby .................. 340/10.51 |

FOREIGN PATENT DOCUMENTS

| | | |
|---|---|---|
| DE | 19530823 A1 | 2/1997 |
| EP | 0478092 A1 | 4/1992 |
| EP | 0494114 A2 | 7/1992 |
| EP | 0585132 A1 | 3/1994 |
| EP | 0598624 A1 | 5/1994 |
| EP | 0615285 A2 | 9/1994 |
| EP | 0574399 B1 | 3/1997 |
| EP | 0786749 A1 | 7/1997 |
| EP | 0760985 B1 | 3/2000 |
| EP | 1225585 A1 | 7/2002 |
| EP | 1326219 A2 | 7/2003 |
| EP | 1339032 A2 | 8/2003 |
| FR | 2392451 A1 | 4/1978 |
| WO | 9210765 A1 | 6/1992 |
| WO | 9529456 A1 | 11/1995 |
| WO | 9813801 A1 | 4/1998 |
| WO | 9813802 A1 | 4/1998 |
| WO | 9905660 Z1 | 2/1999 |
| WO | 0169516 A2 | 9/2001 |
| WO | 0169524 A2 | 9/2001 |
| WO | 0169525 A1 | 9/2001 |
| WO | 0180174 A1 | 10/2001 |
| WO | 0221424 A2 | 3/2002 |
| WO | 02086910 A2 | 10/2002 |
| WO | 02096781 A1 | 12/2002 |
| WO | 03044892 A1 | 5/2003 |
| WO | 03061060 A2 | 7/2003 |
| WO | 2004023391 A1 | 3/2004 |
| WO | 2004074964 A2 | 9/2004 |
| WO | 2005008578 A2 | 1/2005 |
| WO | 2005111961 A1 | 11/2005 |

OTHER PUBLICATIONS

Brock, "Integrating the Electronic Product Code (EPC) and the Global Trade Item No. (GTIN)", White Paper available at www.autoidcenter.org/pdfs/MIT-WUTOID-WH-004.pdf, Nov. 1, 2001, 25 pages, MIT AUTO-ID Center, Massachusetts Institute of Technology, Cambridge, MA, USA.

Unknown, "Combating Counterfeit Drugs: A Report of the Food and Drug Administration", Feb. 2004, http://www.fda.gov/oc/initiatives/counterfeit/report02_04.html, 37 pages, The United States Department of Health and Human Services, U.S. Food and Drug Administration, USA.

Unknown, "FDA's Counterfeit Drug Task Force Interim Report" available at http://www.fda.gov/oc/initiatives/counterfeit/report/interim_report.html, Oct. 2003, 27 pages, The United States Department of Health and Human Services, U.S. Food and Drug Administration, USA.

Hannibal, "Opt-out Feature for RFID Tags", available at http://arstechnica.com/news/posts/1052194426.html, May 5, 2003, 3 pages, Ars Technica, LLC, USA.

Unknown, "IST-2000-29551 SIDCOM", "Network on Sensing, Identification and Data Communications with Passive Non-Contact Technologies" available at www.fuse-network.com/sidcom/eurosid/demonstration/projects/fl_04.pdf, 4 pages, accessed Jun. 2004, PAV CARD GmbH, Institut für Angewandte Mikroelektronik Forschungs-und Entwicklungs GmbH, Germany.

Losefsky, "It's Here—Alien Technology", The McCombs School of Business Magazine, 2001, 3 pages, University of Texas, USA.

Unknown, "Mikoh Coporation Adopts Tag-It™ RFID Smart Label Inlays From Texas Instruments", available at http://www.ti.com/tiris/docs/news/news_releases/2000/rel07-13-00.shtml, Jul. 13, 2000, 4 pages, Texas Instruments Inc., USA.

Unknown, "Pervasive Computing Goes the Last Hundred Feet...", available at http://dsonline.computer.org/0306/d/b2app3.htm, accessed Jun. 10, 2004, 3 pages, Institute of Electrical and Electronics Engineers, Inc., USA.

Unknown, "Protection of Personal Property Via Radio Frequence Identifiers", Apr. 28, 2004, published at IP.com as Document ID 000028146, 2 pages, USA.

Unknown, "RFID May Reduce Electricity Theft", available at http://www.rfidjournal.com/article/articleview/56/1/1, Aug. 20, 2002, 2 pages, RFID Journal, Inc., USA.

Unknown, "RFID Medicine Tracking", available at http://www.yenra.com/rfid-medicine-tracking/, Jul. 18, 2003, 2 pages, Yenra, USA.

Sarma, "Towards the 5¢ Tag", Nov. 1, 2001, 19 pages, MIT AUTO-ID Center, Massachusetts Institute of Technology, Cambridge, MA, USA.

Schoenberger, "The Internet of Things; Chips at the Checkout Counter", Forbes Magazine, Mar. 18, 2002, vol. 169, Issue 5, 3 pages, Forbes, USA.

Starkman, "International Paper and Motorola Agree to Put Microchips in 'Smart Packages'", Wall Street Journal, Apr. 13, 2000, 2 pages, The Wall Street Journal, USA.

Vanscoy, "They Know What You Eat", Smart Business, 2001, 2 pages, Mindfully.org, USA.

Unknown, "Variety and Versatility in a Coil . . . and More", available at http://www.rcdtechnology.com/application.html, 2001-2002, 2 pages, RCD Technology, Inc., USA.

Witt, "Packaging Meets RFID—Finally", Material Handling Management, Abstract, Jun. 2000, 3 pages, vol. 55, Issue 6, USA.

Finkenzeller, RFID Handbook: Fundamentals and Applications in Contactless Smart Cards and Identification, Second Edition, 2003, 40 pages, Wiley and Sons, Inc., USA.

Unknown, RFIDwasher, printed from http://rfidwasher.com, 2004, 1 page, Orthic Limited, UK.

Ehisen, "Prying Eyes," State Net Capitol Journal, Jul. 4, 2005, vol. XIII, No. 23, 15 pages, State Net, USA.*

Unknown, "RFID Tag Privacy Concerns," Watching Them, Watching Us, Spy Blog, http://www.spy.org.uk/cgi-bin/rfid.pl, 23 pages, USA.*

Ewitz, "The RFID Hacking Underground," WIRED magazine, Issue 14.05, May 2006, 6 pages, CondeNet Inc., USA.*

Unknown, "Cracked It!," Guardian Unlimited, Nov. 17, 2006, 8 pages, UK.*

International Search Report and Written Opinion for PCT/IB2007/054686, dated Jul. 21, 2008, 15 pages.

* cited by examiner

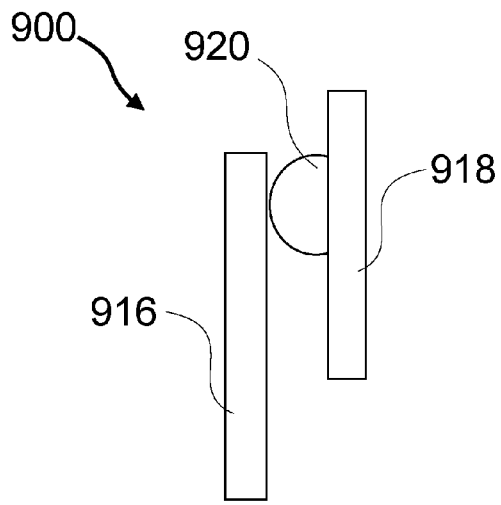 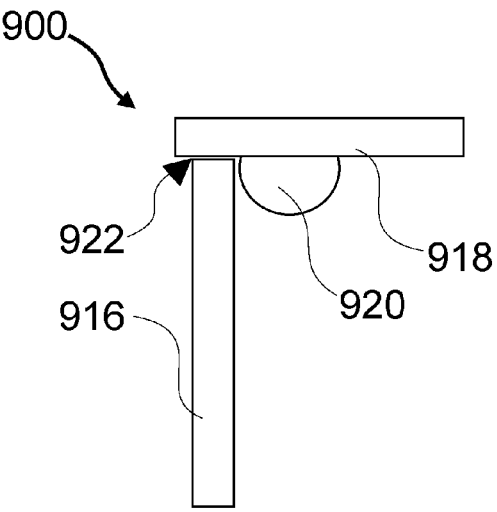
FIGURE 9A  FIGURE 9B
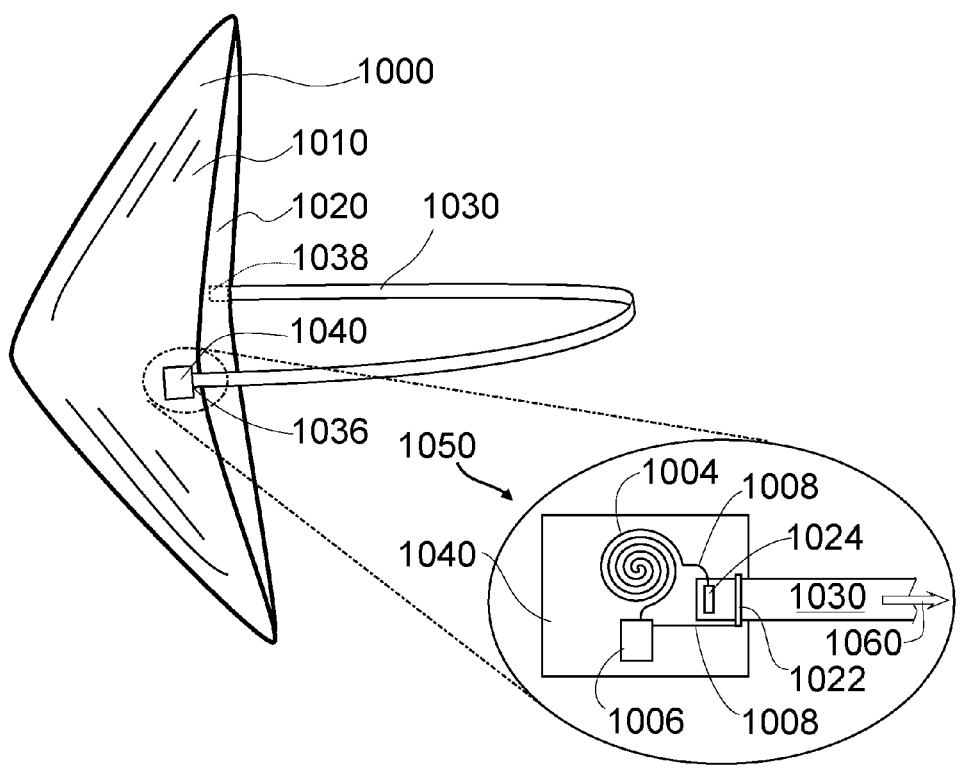
FIGURE 10

REVERSIBLY DEACTIVATING A RADIO FREQUENCY IDENTIFICATION DATA TAG

CROSS-REFERENCE TO RELATED APPLICATION

This application is a continuation-in-part of prior U.S. patent application Ser. No. 10/836,023, filed Apr. 30, 2004, now U.S. Pat. No. 7,151,455, the entirety of which is hereby incorporated by reference herein for all purposes.

BACKGROUND

Radio frequency identification (RFID) technology generally refers to small tags comprising a data circuit (e.g., a semiconductor chip) in electrical communication with at least one antenna, wherein information encoded in the data circuit can be transmitted wirelessly to an external reader. RFID tags that may be passive (requiring no internal power supply, but relying on energy received from a radiofrequency source via the antenna in order to function and transmit a signal) or active (containing a battery as a power source). RFID circuits may operate with dipole antennas or may be inductively coupled (e.g., comprising coil antennas) or operate in other known ways (e.g., electrically coupled with electrodes. Such tags may be embedded in or attached to a product or material to convey information that may be read by a reader. Generally, RFID tags (also known as smart tags) include a data circuit and an antenna. In particular, smart tags may include a semiconductor, a coiled, etched, or stamped antenna, a capacitor, and a substrate on which the components are mounted or embedded. A protective covering may be used to encapsulate and seal the substrate. Principles of RFID design are given by Klaus Finkenzeller, *RFID Handbook* (West Sussex, England: John Wiley and Sons, 2003), particularly pages 1-59.

In general, RFID systems include readers and tags in which the tags generate an electromagnetic response to an electronic signal from a reader. The response signal is read by the reader, typically with a readable range on the order of a few feet for passive tags, though broader or narrower ranges are possible. The signal generated by the tag includes information (e.g., an electronic product code) that identifies the tag or the article comprising the tag.

RFID tags are expected to become ubiquitous in future products, and are already being implemented in some supply chains for tracking products. However, existing systems do not use RFID tags to ensure the proper loading or orientation of products and packaging.

Further, a major roadblock to the commercial implementation of RFID technology has been consumer privacy. Public fears about the potential misuse of the information that could be obtained by tracking purchases with RFID have resulted in delays in several efforts to implement RFID. Existing systems, however, fail to deactivate an RFID tag mechanically and reversibly while retaining the consumer benefits associated with RFID technology. Further, existing technology lacks a means for allowing a user to control when an RFID-enabled device may be scanned by others to reduce the risk of hacking or misuse of sensitive information.

The need for personal control over RFID access is highlighted by recent concerns about "RFID hacking," in which a third party equipped with an RFID scanner can read information contained in RFID tags belonging to a person. This can include RFID information in RFID-enabled passports, in security documents, in RFID-enabled credit cards, in RFID-enabled cell phones, RFID fobs or RFID-enabled smart cards used to access an account or make charges to an account, etc. Existing technology lacks a simple, convenient, and/or inexpensive means for allowing a user to control when an RFID-enabled device may be scanned by others to reduce the risk of hacking or misuse of sensitive information.

SUMMARY

In an embodiment, aspects of the invention include a system for reducing the risk of unwanted scanning of an article. In particular, an embodiment of the invention includes a radio frequency identification (RFID) circuit having an RFID chip, an antenna for receiving and emitting radio frequency signals from an external RFID scanner, a connection joining the antenna and the RFID chip, and a switch (e.g., environmentally sensitive) in communication with at least one part of the RFID circuit. In operation, the RFID scanning of the RFID circuit is substantially disabled when the state of the switch is off and enabled when the state of the switch is on. The state of the switch is determined, for example, by an environmental factor that may be selectively controlled by a user.

In another form, aspects of the invention include a personal protective article having an RFID tag in an RFID circuit. The RFID circuit includes a switch responsive, for example, to an environmental condition related to the manner in which the article is used. The RFID tag is activated when the article is being worn properly, and may be deactivated when the article is in a configuration indicative of improper use.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 9A is a diagram of an exemplary embodiment of a system in which a relative orientation-sensitive switch has a first member and a second member that are not communicating electrically.

FIG. 9B is a diagram of an exemplary embodiment of a system in which a relative orientation-sensitive switch has a first member and a second member that are in contact to establish a zone of electrical contact.

FIG. 10 is a diagram of an exemplary embodiment of a system in which a face mask has a load-sensitive RFID circuit.

Corresponding reference characters indicate corresponding parts throughout the drawings.

DETAILED DESCRIPTION

Figure 1:
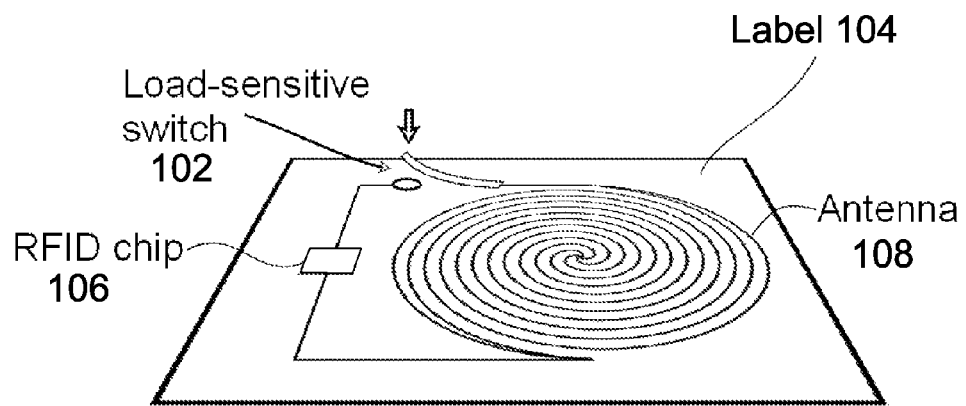
FIG. 1 illustrates an exemplary embodiment of a system according to an embodiment of the invention in which a load-sensitive switch joins a radio frequency identification (RFID) chip to an antenna.

Embodiments of the invention generally relate to the field of radio frequency identification (RFID) tags. In particular, embodiments of the invention relate to a system and method for using one or more RFID tags for orientation, tamper-evidence, and user privacy. Embodiments are also presented dealing with additional aspects of security and safety, including prevention of RFID hacking or unwanted reading of RFID tags, particularly those associated with sensitive information, financial accounts, or security documents. Further embodiments pertain to personal protection, physical safety, compliance with safety procedures, and the like.

There have been many efforts to protect consumers from product tampering. To date, however, the onus for detecting tampering has generally been on the consumer who bears the responsibility for checking the integrity of containers or the presence of indications of tampering such as whether a pop-up section of a bottle lid has popped-up or not. Many consumers are not trained in detecting tampering or fail to recognize that an indicator for tampering has been activated. In some cases, a tamperer can simply remove the indicating device or indicia. In general, for most products, there have not been successful methods brought to the marketplace for automatically detecting tampering and eliminating tampered products before the product is sold to the consumer. Existing system fail to provide tamper-evident packaging with automated detection of tampering.

Some existing systems include RFID-enabled labels that can detect damage or removal of the label, as disclosed in U.S. patent application serial number 10/416,921, now abandoned, entitled "A Tamper Indicating Radio Frequency Identification Label with Tracking Capability" by Peter Atherton and assigned to Mikoh Corporation. This technology includes "COUNTERFOIL" smart labels that emit a Signal when the labels are removed or broken. The labels have breakable conductive leads to RFID circuits. Tampering with the labels disables the RFID circuit or can be detected by circuitry that causes a particular code to be written to the RFID chip. For example, the use of RFID technology in this manner detects tampering with electricity meter boxes associated with electricity theft. The existing technology, however, is based on single RFID tag systems in labels in which the tag is permanently disabled by tampering or in which tampering causes a new code to be written to an expensive writable RFID tag. Existing systems fail to use two or more RFID chips or two or more antennas to allow deactivation of one RFID signal and activation of another RFID signal to retain the consumer benefits of RFID technology.

Standards for product tagging from EPC Global call for chips to have a switch that can be activated by a code to kill the tag. Killing the tag generally refers to deactivating the microchip itself using an electronic code or other means, or at least removing or erasing a portion of the data stored in the tag (e.g., an electronic product code). However, killing the tag may eliminate all or some of the functionality and the benefits that can be obtained through RFID technology (e.g., consumer benefits such as automated registration of products, automated interactions of other articles with the purchased items, consumer tracking and cataloging of purchased articles using RFID systems, and automated safety systems).

Aspects of the invention provide load sensing, orientation sensing, detection of product and package tampering, and user privacy with radio frequency identification (RFID) technology. Embodiments of the present invention include RFID tags that are sensitive to an external environmental factor such as orientation of the tag, the application of pressure to a portion of the tag, the presence of light, or other factors, such that the tag is inactive unless the proper conditions, environmental or otherwise, are met. In an embodiment, the RFID circuit comprises a switch responsive to an environmental factor such that when the switch is open, the circuit is open and the tag does not operate or produces a much weaker signal when interrogated by an RFID scanner. When the switch is closed, the tag may operate at its normal strength and be readily detected by an RFID scanner. The switch may be located, directly or indirectly, between an RFID chip and an antenna (e.g., a coil for an inductively coupled RFID tag) or may be elsewhere in the RFID circuit or may communicate with a component within the RFID chip itself. Alternatively or in addition, inactivation of the RFID tag may be achieved by selectively shielding the tag or the antenna of the tag in response to an factor (e.g., an environmental factor) such that the tag is difficult or impossible to scan when shielded, but may be read more readily when the shielding means (e.g., an environmentally-responsive shielding means) is not shielding the tag. Such shielding means may include, but is not limited to, an assembly in which the tag can slide into or out of a shielded region in response to orientation, or a shield that moves over or around the antenna of the RFID tag in response to orientation relative to the gravitational field or in response to the relative orientation of one component of an article to another.

In an embodiment, such a tag can be part of the RFID system in a passport, smart card, security document, or other RFID-enabled device such that scans of the information stored on one or more RFID chips in the RFID-device cannot be readily scanned except when the proper conditions (e.g., environmental conditions) are met. For example, a passport with the RFID system of the present invention might not be readily scanned with a conventional RFID scanner unless a pressure-sensitive switch is depressed, or unless the passport is inverted, or unless the passport is fully open to close a connection via a switch. Such RFID systems include a circuit comprising a switch to allow the user to selectively turn the circuit on or off (e.g., closed or opened) to enable or disable external scanning. The circuit may include a load-sensitive mechanical switch, an orientation-sensitive switch, or any other switching means such that an RFID circuit is inactive during one or more of the following: when the RFID-enabled device is not properly oriented, when a portion of the device is or is not under a mechanical load, and when the orientation or position of a portion of the device package does not meet a predetermined criterion.

For example, the RFID circuit in a passport may be inactive when the passport is closed, due to a switch that is sensitive to the orientation of the plane of the front cover of the passport relative to the plane of the rear cover. Opening the cover of the passport activates or enables external scanning. Alternatively or in addition, scanning of the passport may involve depressing a pressure-sensitive portion of the passport comprising a switch to close the circuit, and/or holding the spine of the passport in a vertically oriented upside-down position to allow a gravity-sensitive sliding or flowing element to move to create electrical contact between conductors to close a circuit or to allow an antenna to move out of a shielded position to enable scanning.

In an embodiment, activating the passport for RFID scanning may involve a combination of mechanical actions using a hybrid circuit with a series of switches such as an orientation-sensitive switch and pressure-sensitive switch, both of which enable scanning when activated. Other switches such as photosensitive switches are contemplated to be within the scope of an embodiment of the invention. In such an embodiment, the RFID circuit is inactive until light of a certain intensity or having other characteristics shines on a portion of the passport, thus making passports that are closed or in a pocket generally inaccessible to scanning. Principles for photosensitive switches are disclosed in U.S. Pat. No. 4,356,405; U.S. Pat. No. 5,144,286; U.S. Pat. No. 5,463,205; and U.S. Pat. No. 6,743,988.

Such concepts may be extended and applied not only to smart cards and other security documents and devices, but also to general merchandise and packaging. For example, environmentally-responsive switches in RFID circuits may be used to track goods and ensure proper loading or orientation of products and packaging to reduce the risk of product tampering and to detect when products are being misused. Such features, for example, may be useful in systems for ensuring compliance with safety procedures and protocols, such as ensuring that proper protective equipment is worn before users can enter a facility or perform a task requiring protective gear. The use of switches, environmentally-sensitive or otherwise, may be used to reduce the risk of "gaming" RFID-enabled compliance monitoring systems. For example, a worker carrying RFID-enabled safety glasses through a portal, but not wearing the glasses, may be detected as not in compliance with the requirement to wear the glasses because an orientation-sensitive switch in an RFID circuit either fails to give a "pass" signal or triggers an alert indicating that that the glasses, while possibly present, are not being worn properly. The orientation of the temples (e.g., side elements assign over the ears) relative to the frame or lenses may be used, for example, to activate or inactivate one or more RFID circuits.

In another embodiment, a face mask with an RFID tag comprises a load-sensitive switch that may activate an RFID circuit only when there is tension on an elastic portion that goes around the ears or around the head to hold the face mask in place. Without the tension indicative of the product being properly worn, an RFID-based safety compliance monitoring system may prevent access to a user or otherwise indicate that the user has not properly complied with safety requirements.

For example, if it is determined by RFID scan that a worker has a missing or improperly worn protective item, an audible or visual alarm may be generated, or access to one or more particular work areas may be limited or denied, or an email alert may be sent to a supervisor, etc.

Other embodiments of the invention include RFID systems that detect product tampering and may be implemented directly in products or product packaging, as opposed to attachable labels, or in which a low cost passive read-only RFID tag is inactive until tampering occurs. Such systems allow automated detection of tampering and overcome some of the limitations of the prior art.

Still other embodiments of the invention include products and product packaging comprising permanent RFID tags associated with removable antennas to protect user privacy without removing the Electronic Product Code from a microchip.

Figure 2:
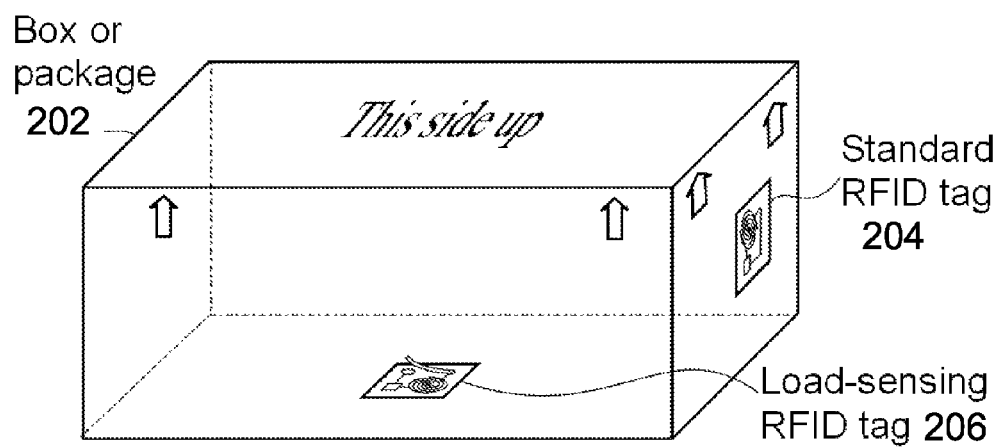
FIG. 2 is a diagram of an exemplary embodiment of a system according to an embodiment of the invention in which a box has a load-sensing RFID tag and a conventional RFID tag.
Figure 3:
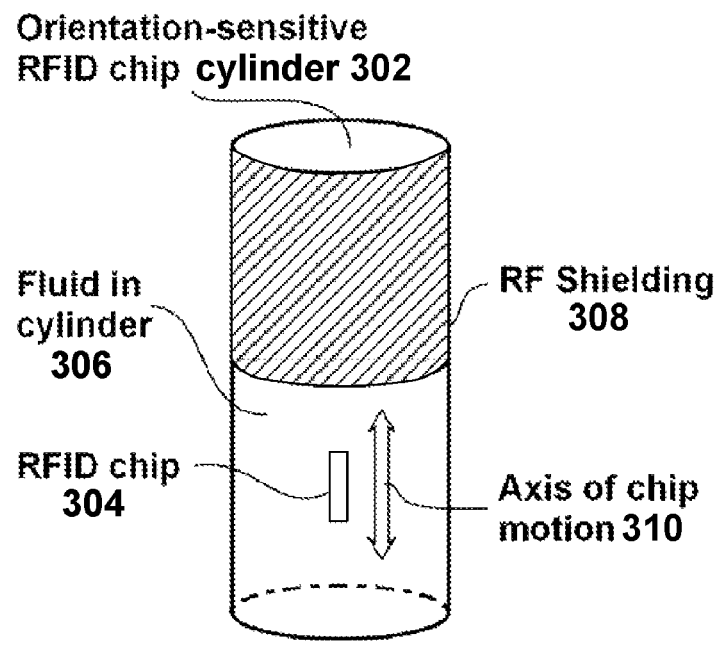
FIG. 3 is a diagram of an exemplary embodiment of a system according to an embodiment of the invention in which an RFID chip floats in a fluid-filled, partially RF-shielded container.
Figure 4:
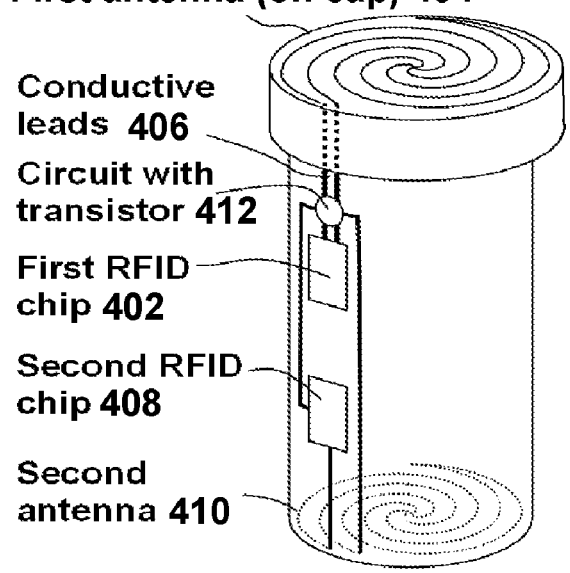
FIG. 4 is a diagram of an exemplary embodiment of a system according to an embodiment of the invention in which a container has two RFID chips for tamper detection.
Figure 5:
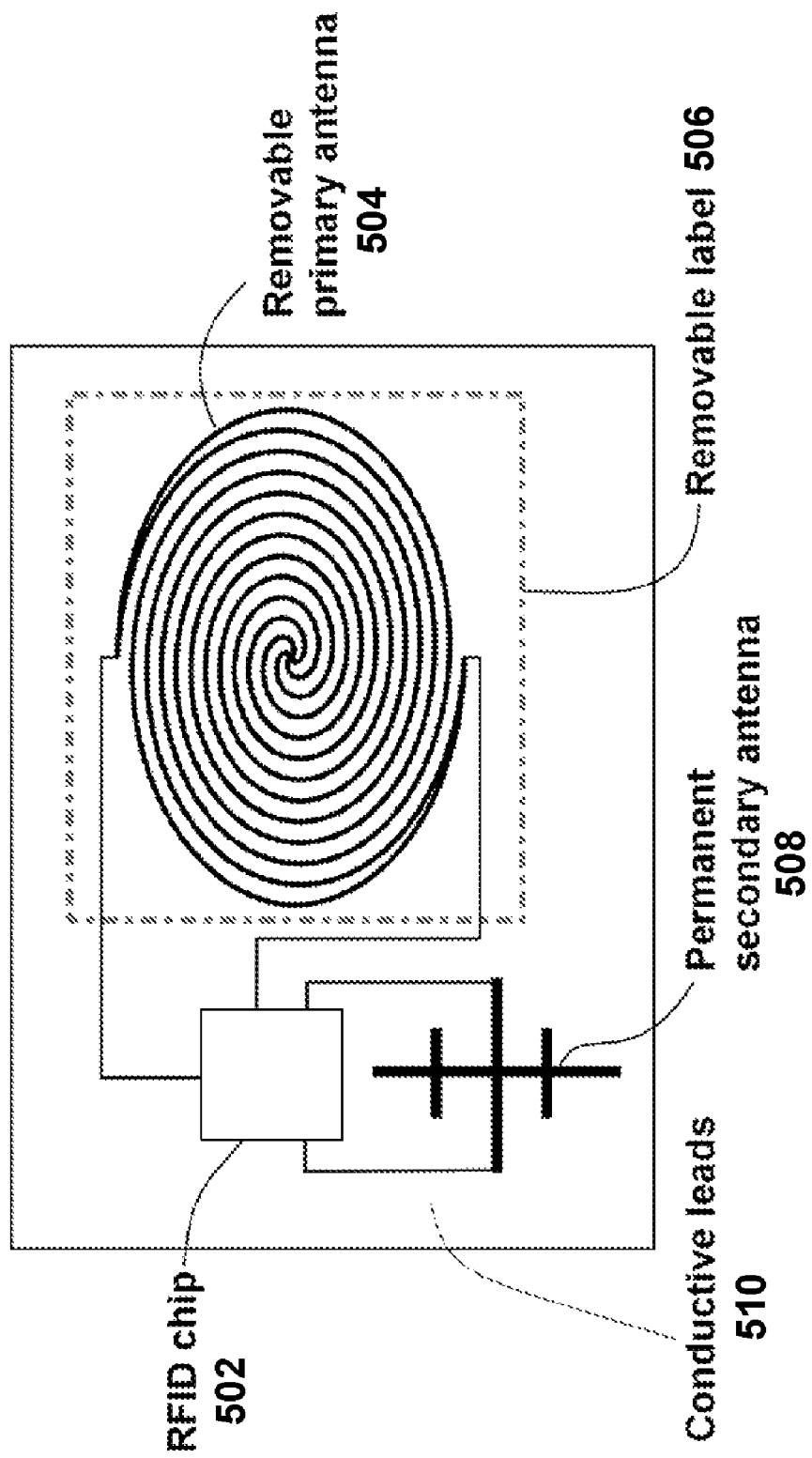
FIG. 5 is a diagram of an exemplary embodiment of a system according to an embodiment of the invention in which an RFID chip is attached to a permanent antenna and a removable antenna.
Figure 6:
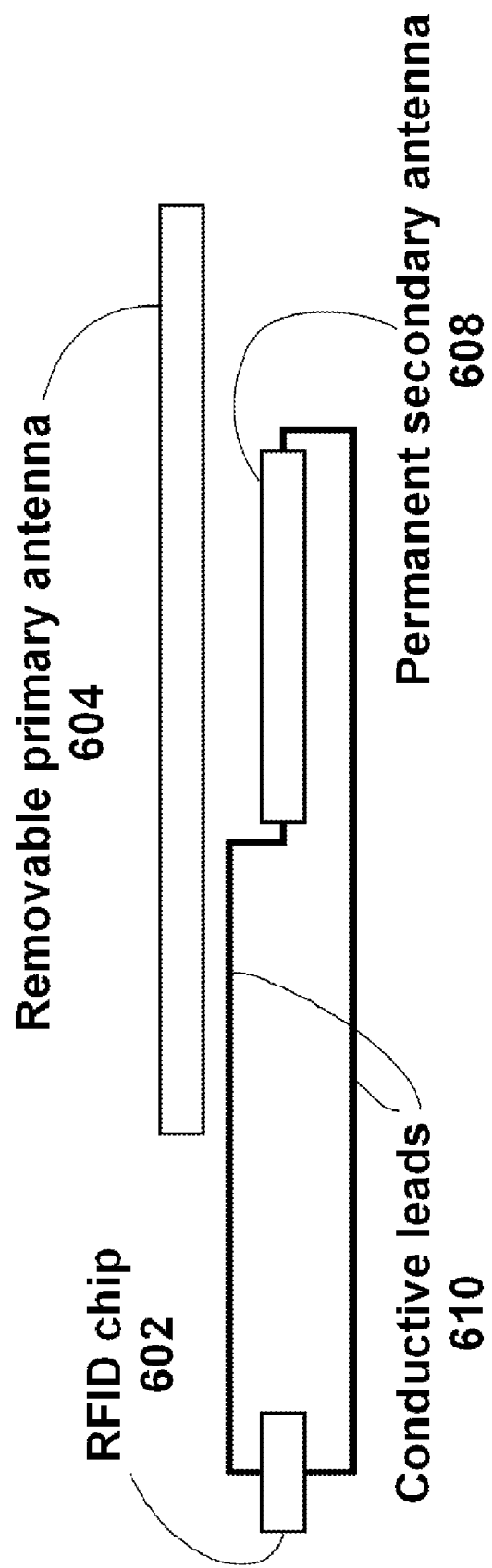
FIG. 6 is a diagram of an exemplary embodiment of a system in which an RFID chip is attached to a permanent antenna and cooperatively associated with, but not conductively attached to, a second removable antenna.

In an embodiment, the invention includes mechanically activating or deactivating a radio frequency identification (RFID) tag by load or orientation or user control. In particular, the invention includes a load-sensitive RFID circuit such as illustrated in FIG. 1 and FIG. 2, an orientation-sensitive RFID chip container such as illustrated in FIG. 3, a tamper-evident container with two RFID chips such as illustrated in FIG. 4, and an RFID tag with a removable antenna such as illustrated in FIG. 5. RFID chips may also be cooperatively associated with non-contacting removable antennas that provide energy via inductive coupling or resonance, as shown in FIG. 6.

Radio Frequency Identification (RFID)

RFID smart tag technology is known and understood by those skilled in the art, and a detailed explanation thereof is not necessary for purposes of describing the method and system according to the present invention. With RFID or other smart tag technology, a vendor may associate a unique identification code with a batch of raw materials, and enter physical property data into a database in which the data is associated with the identification code. When the raw material shipment is received at a manufacturing facility, an RFID scanner may automatically scan the RFID chip and retrieve the associated information from the database, verify that usable raw material has been received at the correct facility, provide quality information, and so forth.

RFID chips may be used to track products grouped in various hierarchies: (1) individual items or single packages containing multiple items for consumer purchase; (2) cartons or cases of multiple items; (3) pallets of multiple cartons or cases; and (4) loads (e.g., truckloads, shiploads, or railcar loads) of multiple pallets. The products at each of these levels may be assigned an RFID label that is associated with information pertaining to at least one adjacent hierarchical level. For example, an RFID label on a pallet may be associated in a database with the RFID labels for each carton on the pallet, or may be associated with data pertaining to the RFID label from the truckload.

RFID tags responsive to environmental conditions may be helpful in preventing improper storage and transport conditions, particularly for paper-based packaging materials such as corrugated board or paperboard which may be sensitive to moisture or may fail when improperly loaded or oriented. Proper condition monitoring of conditions experienced by packaging or by the contents of the packaging may be important, for example, for perishable items such as food, beverages, agricultural materials, dairy products, and biological materials such as bacteria, enzymes, microbes, live plants and plant samples, live animals or insects, etc. Hazardous and toxic materials may also benefit from improved monitoring of environmental conditions during storage and transport.

RFID tags of any known type may be used, including active RFID tags, passive RFID tags, and semi-passive RFID tags. Active RFID tags are battery-powered devices that transmit a signal to a reader and typically have long ranges such as 100 feet or more. Passive RFID tags are not battery powered but draw energy from electromagnetic waves from an RFID reader. Passive RFID tags often have a range of about 10 feet or less. Semi-passive RFID tags employ a battery to run the circuitry of a chip but rely on electromagnetic waves from a reader to power the transmitted signal.

Any of these chips may be read-only chips, which comprise a fixed electronic code, or they may be read-write chips, which allow new information to be added. The chips may also be associated with sensors to read sensor information and transmit a signal responsive to the information, such as a value from a biosensor. By way of example, principles for associated RFID or related wireless identification technology with sensors are described in U.S. Pat. No. 6,662,642, "Vehicle Wireless Sensing and Communication System," issued Dec. 16, 2003 to Breed et al., herein incorporated by reference, which also discusses methods for identifying the location of RFID chips.

Exemplary RFID tag manufacturers include Matrics, Alien Technology, Philips Semiconductor, and Texas Instruments. Manufacturing may be done by robotic techniques (e.g., "flip-chip"/"pick and place" techniques), fluidic self-assembly (FSA), the Philips "I-connect" method or the Philips "vibratory assembly" method, or other known processes. Exemplary RFID reader manufacturers include Intemec Technologies, Symbol Technologies, Matrics, AWID (e.g., their multi-protocol reader operate at various frequencies), and others. Software systems to support RFID systems are provided by IBM Global Services (which has acquired PriceWaterhouseCoopers), Texas Instruments, Manhattan Associates (particularly for integrated supply chain executions), SAP, and others. Printed RFID labels may be made using equipment from Zebra Technologies and other vendors.

General Principles of RFID Technology and Antenna Design

An antenna may be made by any known method, including metal deposition, printing of conductive inks, etc. By way of example, the RFID tags may employ conductive ink technology of RCD Technologies (Bethlehem, Pa.). Antennas may be printed using any known format, and may, for example, comprise double-sided, interconnected coils. Any known frequency may be used, such as 100 kHz or 125 kHz ("low frequency"), 13.56 MHz ("high frequency"), 860-930 MHz such as 900 MHz or 915 MHz ("ultra high frequency" or UHF), and 2.45 GHz or 5.8 GHz (microwave frequency), or other known frequencies.

The RFID system may follow the systems disclosed by the MIT Auto-ID Center, including the use of an electronic product code (EPC); a Savant system to manage the codes being read with a distributed architecture and processes such as data smoothing, reader coordination, data forwarding, data storage, and task management; and Object Name Service (ONS) for matching EPC information to item information, typically using a domain name service (DNS) to route computers to Internet sites; and Physical Markup Language (PML) to describe information about a product.

Other vendors of integrated RFID systems or other tools for RFID include CheckPoint Systems, Tyco Sensormatic, Escort Memory Systems, Psion Teklogix (particularly for software systems to assist in logistics), SAMSys Technologies, Savi Technology, SCS Corporation, TAGSYS, ThingMagic LLC, and others. Supply-chain software may be provided by Crimson Software, Descartes Systems, EXE Technologies, Globe Ranger, Manhattan Associates, IBM Global Services, SAP, etc. These commercial systems are adaptable to track additional information provided by the sensors of the present invention, and to initiate corrective action in response to detected problems (e.g., missing load).

It is to be understood that many other technologies are equivalents for and/or have equivalence to the RFID embodiments disclosed herein. For example, RFID readers could be replaced with optical scanners, image analysis devices, arrays of chemical detection devices, and the like.

A related technology within the scope of the present invention is Surface Acoustic Wave (SAW) technology. For example, InfoRay (Cambridge, Mass.) markets a passive smart tag that is said to achieve long ranges (up to 30 meters) using a Surface Acoustic Wave (SAW) device on a chip coupled with an antenna. The SAW device converts a radio signal to an acoustic wave, modulates it with an identification code, then transforms it to another radio signal that is emitted by the smart tag and read by a scanner. The identification code of the smart tag is extracted from the radio signal. RFSAW, Inc. (Dallas, Tex.) also provides minute Surface Acoustic Wave (SAW) RFID devices that may be used within the scope of the present invention. Exemplary SAW devices are disclosed in U.S. Pat. Publication No. US20030111540A1, "Surface Acoustic Wave Identification Tag Having Enhanced Data Content and Methods of Operation and Manufacture Thereof," published Jun. 16, 2003, by Hartmann.

Another related technology is ultra-wide band (UWB) technology. UWB technology permits wireless communication between objects using low-power electromagnetic transmissions. However, receivers and transmitters generally are both active but use very low power, typically less than that of radio frequency noise, relying on intermittent pulses which cover a broad band of frequencies rather than transmissions of a particular frequency. UWB technology may provide much higher spatial capacity (information transmission per unit area) than other wireless standards such as BLUETOOTH brand computer communication services or Institute of Electronics and Electrical Engineering (IEEE) 802.11a or 802.11b.

RFID Tags as Load Sensors or Orientation Sensors

Referring first to FIG. 1, an exemplary embodiment of a system according to an embodiment of the invention includes a data tag capable of being mechanically and reversibly deactivated by load or orientation or user control. In a particular embodiment, the invention includes improved RFID tags that comprise a load-sensitive mechanical switch 102 capable of enabling communication of a signal when a package is not properly oriented or when the package is not loaded with product. The load-sensitive switch includes dome-like switches or other known load-sensitive devices. However, user-activated on-off switching of RFID circuits may be done in any known manner.

Alternatively, in one embodiment, the switches of the present invention exclude those that can readily be operated by a human finger, but instead may be positioned such that finger contact cannot readily operate the switches, or may require loads greater than can be easily applied by a finger (e.g., greater than about 10 pounds or greater than about 30 pounds). In one alternative embodiment, the system does not rely on a pressure-sensitive mechanical switch, but employs other mechanisms disclosed herein.

FIG. 1 shows an example of an RFID label 104 in which a load sensitive switch 102 joins an RFID chip 106 to an antenna 108. When a load depresses the switch 102, the RFID label 104 is enabled such that the information in the chip 106 is transmitted by the antenna 108 in response to scanning by an RFID reader at a suitable frequency. When the load is removed, the RFID chip 106 cannot be read by a conventional reader because of an inadequate response signal. In one embodiment, the switch 102 is a mechanical switch. Closing and opening the switch 102 activates and deactivates, respectively, the RFID chip 106 and the antenna 108. Alternatively, closing and opening the switch 102 deactivates and activates, respectively, the RFID chip 106 and the antenna 108. Activating the RFID chip 106 and the antenna 108 enables the RFID chip 106 and the antenna 108 to communicate (e.g., transmit or receive) data (e.g., to a scanner or reader or interrogator). Communicating data, in one embodiment, includes transmitting or receiving one or more RFID codes or other identification information via one or more RF signals.

Referring next to FIG. 2, an exemplary embodiment of a system according to an embodiment of the invention includes a box 202 with two RFID tags 204, 206. A load-sensing tag 206 on the bottom of the box 202 is enabled when the load-sensitive switch is depressed by the load applied by the contents of the box 202 when the box 202 is in the proper orientation. If the box 202 is inverted, the items in the box 202 no longer depress the load-sensitive RFID tag 206, causing the load-sensitive RFID tag 206 to be disabled. A second RFID tag 204 (e.g., a conventional RFID tag) is shown mounted on a side of the box 202. The second RFID tag 204 is not load sensitive and transmits identifying information regardless of the orientation of the box 202.

Alternatively, the second RFID tag 204 may be mounted on the top of a box (not shown) and further may be load sensitive, such that the second RFID tag 204 operates to indicate crushing or excessive loading of a box by other items placed on top of it. The presence of a load above a predetermined threshold activates or inactivates the second RFID tag 204, as desired, by properly configuring the switch and the associated circuitry.

In other embodiments, a micro electro mechanical system (MEMS) device or the like serving as an orientation detector could be associated with an RFID circuit or label. A MEMS device, for example, could include a miniature gravity-sensitive circuit, such as a box with a small, unattached conductive plate or ball in it that allows gravity to pull the plate or ball into contact with conductive leads when the box is in a predetermined orientation; otherwise, the circuit remains open. Thus, a miniature orientation sensor allows an RFID tag to generate a signal only when the label is in a predetermined orientation. Such an orientation sensor could be operated in addition to or in series with a load sensor. When the orientation sensor is in series with a load-sensitive switch, the RFID signal is blocked (or greatly diminished) when either the load is absent or the orientation is wrong. Alternatively or in addition, when the orientation sensor and the load sensor are in the same circuit, a first RF signal is generated with a first RFID code from the load-sensitive circuit, and a second RF signal is generated with a second RFID code from the orientation-sensitive circuit.

Further examples of an orientation-sensitive switch which may be adapted within RFID circuits of the present invention include those of U.S. Pat. No. 5,701,900, hereby incorporated by reference. While mercury is known in a variety of orientation-sensitive switches, other conductive fluids can be used in some of the switch designs originally developed for mercury. For example, ferro fluids or magnetorheological fluids comprising iron-based particles or other metals in suspension may be used.

In general, a wide variety of known orientation sensors or switches (including devices often described as inclinometers) may be used to activate or deactivate an RFID circuit. Aspects of the invention are operable with any form, quantity, type, or kind of switches including purely mechanical, partially mechanical, electromechanical, nano, molecular, biological, photosensitive, particle, radioactive, or the like.

In another embodiment, a MEMS gravity-sensitive switch or a load-sensitive switch toggles between two circuits with two different RFID tags, such that when there is a load present or when the proper orientation exists, respectively, an RFID scanner will read a signal from a first RFID tag, which indicates that the container is in a state having a load or the proper orientation, respectively. When the load is not present or the orientation is improper, a second RFID tag is active and the first tag is inactive. In this manner, scanning a package would read a signal from one of two RFID tags that provides information about which of two states the package is in. Multiple sets of these toggling pairs of RFID tags could be used to assess both the load state and orientation state, as well as other states. For example, MEMS accelerometers may also be used to trigger theft detection. Alternatively, both tags may be active or inactive as a function of conditions experienced by the container.

The RFID tags 204, 206 may independently be integral with the container or with packaging material for individual products. The RFID tags 204, 206 may be fixedly attached to the container or packaging in a substantially permanent manner (e.g., by adhesive means, sandwiching between adhesively joined layers, or embedding), or may be removably attached.

In one embodiment, the user-activated switch is a gravity-activated device in which the RFID chip is only scannable when the object is held in a predetermined orientation. One embodiment is shown in FIG. 3, which depicts a small fluid-filled cylinder 302 or other container in which an RFID chip 304 (with integral antenna) of higher or lower density than the fluid 306 is able to sink (or float) into an RF-accessible portion of the cylinder 302 when the cylinder 302 is properly aligned, but wherein inverting the cylinder 302 causes the RFID chip 304 to move along an axis of chip motion 310 into a shielded portion of the cylinder 302 such that the RFID chip 304 may no longer be scanned due to RF shielding 308 on the cylinder 302. The fluid may be, by way of example, an oil, water, an alcohol, a glycol, a silicone compound or other liquids, or may be air or other gases. In one embodiment, the shielding 308 is constructed of ferrite or other suitable shielding material (e.g., a soft, magnetic alloy with a high initial and maximum magnetic permeability). Such vials could be on the order of a few millimeters in length and could be readily embedded in plastic components of a product or adhesively attached to an interior portion of a product. Depending on the size of the antenna that is attached to the chip 304, the range of the RFID chip 304 may be short enough to prevent unauthorized scanning.

Alternatively or in addition, the RF shielding 308 is capable of movement relative to the cylinder 302 and to the RFID chip 304. The movement of the RF shielding 308 may be related to or independent of the movement of the RFID chip 304. In another embodiment, the location of the RFID chip 304 relative to the cylinder 302 is fixed while the RF shielding 308 is capable of movement relative to the fixed RFID chip 304 to enable and disable communication by the RFID chip 304.

In another embodiment, two or more conventional RFID tags with distinct RFID codes are mounted on two or more opposing surfaces of a package or box to enable triangulation or proximity detection methods to be applied to determine the orientation of the box. Triangulation with RFID and related principles are disclosed in U.S. Pat. Publication No. 20040036595, "Object Tracking," published Feb. 26, 2004, by Kenny et al., herein incorporated by reference. Two or more scanners are operatively associated to perform RFID triangulation, allowing the system to determine which of the RFID tags on the box is most elevated. Alternatively, a single RFID scanner (including a "smart shelf") is used to determine which RFID tag is closest to it based either on the delay time for a signal or by varying the strength of the emitted signal and determining which of two or more RFID tags on a package is the first to be read as the scanning signal power ramps from low to high levels. The first RFID tag to emit a readable signal in response typically may be presumed to be the most proximate. This knowledge may then be used to determine the orientation of the package.

Other states that could be probed with RFID technology using the architecture of FIG. 1 include environmental conditions such as the humidity and temperature of the package or container. An RFID-responsive antenna could be connected to an RFID chip with a sensor such as a temperature-sensitive or humidity-sensitive adhesive or connection, such that exposure to an inappropriately high temperature or humidity could trigger release of the adhesive and thus open the circuit. Alternatively, a switch element could move or deflect between two positions as a function of temperature or humidity, allowing a switch to toggle between two RFID circuits such that the RFID code read by a scanner could identify which of two states the container was in. More complex circuits could be devised to cover multiple temperature ranges, load ranges, and the like, with multiples RFID chips that could be read depending on the state of the container. A single label could include one or more toggling RFID circuits or a plurality of RFID tags enabled to detect a plurality of states (load, orientation, moisture, etc.). For example, a single package, carton, or case includes multiple RFID chips in toggling circuits for reading in one pass to obtain details such as whether the package has a load, whether the package is at a humidity above 50%, and/or whether the package is upside down. The information obtained from the package may interface with a customer's quality control system. Such temperature and humidity sensors are known in the art. For example, see U.S. Pat. No. 6,294,997 entitled "RFID Tag Having Timing and Environment Modules" by Paratore et al.

Further, the switch illustrated in FIG. 1 may also be any element that has at least two modes. For example, various mode pairs may include on and off, open and closed, transmitting and non-transmitting, a detectable transmission and a non-detectable transmission (e.g., via shielding), and a value above a threshold and a value below a threshold.

RFID for Tamper-evident Packaging

The invention also includes RFID systems to detect product tampering. These RFID systems include a low cost passive read-only RFID tag that is inactive until tampering occurs. Embodiments of the invention may be implemented directly in products, product packaging, or attachable labels.

In one example (not shown), a tamper-evident bottle or other container is shown in which a single RFID chip is attached to the bottle (e.g., embedded in the plastic of the bottle itself or adhesively attached to a surface, such as an interior surface where removal would be difficult), and an antenna is attached to the cap or other closure of the bottle. The RFID chip is connected to the antenna with delicate conductive leads (e.g., micro printed conductive lines) to form a tamper evident seal that is broken when the bottle is opened. The leads may run to the inner surface of the cap, or may join to an exterior portion of the cap. The leads are printed conductive inks or other materials. Tampering with a package (e.g., removing the cap) breaks the continuity of the conductive pathway between an RFID chip and an antenna, such that the chip is deactivated and no longer scannable. That is, when the cap is removed, the leads are broken and the RFID chip is deactivated. Bottles that fail to return an RFID signal are rejected. For example, during checkout or during inventory inspection, bottles are scanned to ensure that the RFID system is intact.

Conductive leads as well as the conductive materials in an antenna may be manufactured by any known technique, including the methods disclosed in U.S. Pat. Publication US20020152605A1, "Method and System for Forming RF Reflective Pathways," published Oct. 24, 2002 by Debraal, and WO 2002/086910A2, "A Method and System for Forming Electrically Conductive Pathways," published Oct. 31, 2002 by Debraal, both of which are herein incorporated by reference.

FIG. 4 illustrates a bottle having a first RFID chip 402 attached to a first antenna 404 via conductive leads 406. Breaking the first circuit (e.g., breaking conductive leads 406) closes a separate alert circuit via a circuit with a transistor 412 that activates a second RFID chip 408 and antenna 410 to provide a positive indication of tampering that is readily detected by scanning. The second RFID chip 408 and antenna 410 may be embedded in or attached to the bottle to facilitate automatic detection of tampering. The code in the second RFID 408 chip is detectable whenever the bottle is scanned. In one embodiment, if the bottle has not been tampered with, the two RFID chips 402, 408 are scanned, yielding a first code and a second code which are known to belong together. If only one code is found instead of two, the bottle is rejected. Rapid scanning of many bottles at once allows a computer to compare the list of first RFID chips 402 from each bottle with the list of second RFID chips 408 from each bottle, to determine if some bottles do not have the second RFID chip 408 that is paired with the first chip 402, allowing automatic detection of the presence of a tampered bottle in the scanned group.

The alert circuit may include a plurality of transistors and other components, and may comprise any known flip flop circuit, relays, or other systems that can switch the active pathways of the RFID circuits such that only one of the two RFID chips is active, depending on the state of the system.

In another embodiment, two or more chips and two or more antennas are combined in a circuit comprising a transistor. A first chip is active when the leads to the antenna in the cap are in place. Voltage from the antenna in the cap is applied to a circuit comprising at least one transistor to open or close a switch, such that when the first chip is active, the circuit for a second chip is inactive, but when the connection to the antenna in the cap is broken (e.g., due to tampering) and no voltage from RF energy is applied to the switching circuit during an RFID scan, then a second circuit is active in which a second RFID chip is connected to a second antenna. Thus depending on whether RF power from the first antenna in the lid is available or not, a switching circuit determines whether a first or second RFID chip is read during an RFID scan. The second chip may have a code that is recognized as an alarm indication. In this manner, an alarm signal is issued by a second RFID chip to facilitate detection of tampered product alternatively or in addition to detecting the absence of an RFID signal as an indication of tampering. Using two chips in this redundant manner improves the reliability of the tamper detection. Further, using two RFID chips instead of one RFID chip simplifies the circuitry in some implementations.

In other embodiments, the first RFID chip is removable such that no RFID signal is generated unless the power from the first antenna in the lid is not present during a scan, thereby enabling activation of the circuit for an RFID alarm chip (the second chip in FIG. 4).

In other embodiments, active RFID chips with microbatteries (e.g., the flexible batteries of PowerPaper Ltd. of Einat, Israel) are used, such that when there is tampering, a switch is activated that connects the battery to the chip and issues an alarm signal that is immediately detected.

In related embodiments, a circuit may be disrupted by opening a box, removing a label, penetrating the wall of a container, slicing a film, etc. In some cases the packaging may be designed such that opening or cutting a package brings two conductive materials into contact to close a circuit and enable an RFID scanner to read an alert signal.

One embodiment of the present invention includes a system comprising a container and a closure and at least two RFID chips having distinct codes, each RFID chip being associated with its own circuit, wherein only one of the at least two RFID chips is active at a time (e.g., to be easily read by a suitable scanner). First and second circuits for a first and second RFID chip, respectively, may include some common elements, such as a shared transistor, capacitor, resistor, conductive leads, etc., but at least one component of each circuit is not shared and is associated with either the container or closure, such that opening the closure, removing the closure, or changing the position of the closure relative to the container (e.g., moving the container a predetermined effective distance) toggles the circuits so that an active RFID circuit becomes inactive and an inactive circuit becomes active.

The container can comprise cardboard, paper, plastic, metal, wood, leather, rubber, glass, and the like, and may be in the form of a box, a disposable package, a pallet, a crate, a mechanical dispenser, a plastic bag, a product package comprising at least one of plastic, paper, and metal, and so forth. The container may be cylindrical, rectangular, ellipsoidal, spherical, or any other shape. The closure may be a cap such as a screw-on or snap-on cap, a cover, a panel, a hinged element, etc. The closure may be completely removable or may remain attached to the container when opened, with attachment means including a tether, a string, a chain, a hinge, an extensible element, a flexible strip, etc. Exemplary combinations of containers and closures include plastic pill bottles and child-proof caps, glass jars and screw-on metal lids, tin cans and removable lids, gas tanks and gas tank caps, shoe boxes and removable lids, cardboard boxes and flaps, and the like.

Products with RFID Tag Systems that Protect User Privacy

The invention also includes products and product packaging comprising permanent RFID tags associated with removable antennas to protect user privacy without removing an electronic product code (EPC) or other data from the tag.

Generally, the ability of third parties to scan RFID tags in consumer products depends on the RFID tags being connected with a suitable antenna to provide an adequate read range for scanners. Conventional-sized antennas provide significant scan ranges, with typical ranges of two to twenty feet for systems being proposed for consumer products. In one embodiment, the RFID tag is associated with a first removable antenna suitable for commercial applications (inventory scanning, automated checkout, product location, etc.), and a second small antenna with a relatively smaller read range such as less than two feet or less than six inches. The first antenna may be physically attached to removable packaging or to a removable label or tab on the product, allowing the purchaser to deactivate conventional scanning by removing the antenna, but retaining functionality of the chip for close-range scanning should the consumer wish to have the product ID read. Alternatively or in combination with a small read range, the second antenna may be shielded to prevent scanning unless a protective structure (e.g., a foil casing) is removed or opened, or may have a mechanical switch activated by a deliberate action (e.g., a fail-open switch on the product for depression by a finger to close the circuit and enable use of the small antenna). For a given RFID reader operating on the system, the ratio of the read range after removal of the first antenna to the read range prior to removal of the first antenna may be less than about any of the following: 0.5, 0.2, 0.1, 0.05, 0.01, and 0.005.

Alternatively, the signal strength returned by the system when being scanned by a given RFID reader at a given location relative to the RFID tag is substantially less after removal of the first antenna. The ratio of the returned signal strength after removal to the signal strength before removal as measured with a conventional RFID reader of suitable frequency (e.g., 13.56 MHz or 915 MHz) at optimum orientation and a distance of 6 inches may be less than about any of the following: 0.5, 0.2, 0.1, 0.05, 0.01, and 0.005. Similar results may be obtained for other distances, such as 2 inches, 24 inches, and 10 feet.

One embodiment is shown in FIG. 5. A RFID chip 502 containing an EPC is connected to a large primary antenna 504 that is removable, being attached to a removable label 506 with conductive leads that may be readily broken when the removable label 506 is removed. The RFID chip 502 is also attached to a small permanent secondary antenna 508. The removable label 506 may be a price tag, a removable Electronic Article Surveillance (EAS) tag, a plastic tab that may be broken or torn off, a cloth product label, an insert in the product such as a cardboard support element in the collar of a shirt, or it may be part of the packaging (i.e., the removable primary antenna may be attached to a cardboard package encasing the product or to a film wrapping the product, while the RFID chip 502 is embedded within the product itself). The conductive leads joining the removable antenna 504 with the RFID chip 502 may be fully or partly removed when the removable label 506 is removed, or may remain on the product. The leads may be metal wires, printed conductive inks, conductive polymers, and the like. The removable label 506 or associated product packaging may be provided with indicia instructing the user to remove the label 506 after purchase, and optionally informing the user that the primary RFID antenna 504 will be removed when the removable label 506 is removed. A capacitor or other electronic components may be associated with the secondary antenna 508 and/or the primary antenna 504.

In another embodiment (not shown), the RFID chip 502 is attached to the permanent secondary antenna 508 with a switch responsive to conscious action by the user to activate the circuit and enable RFID scanning. In this case, a load-sensitive switch is provided, which may be in the form of a bubble switch such as those used in electronic devices (keyboards, etc., to close a circuit and send a signal in response to a touch or finger depression from a user). The switch remains open unless depressed, and when open, the RFID chip 502 is not connected to the antenna 508, making the chip 502 substantially unreadable during a scan. In such embodiments, the permanent antenna 504 need not be small, since the user controls whether scanning is possible or not, but may be adapted to provide a small range (e.g., less than three feet or less than one foot) is desired.

FIG. 6 shows a related embodiment in which an RFID chip 602 is joined by conductive leads 610 to a permanent secondary antenna 608, and is cooperatively associated with a removable primary antenna 604 that is not directly connected to the RFID chip 602 by conductive leads, but rather is inductively coupled to secondary antenna 608. A capacitor or other electronic components may be associated with the secondary antenna 608 and/or the primary antenna 604. Principles for such "non-contacting" electrical communication between two antennas are disclosed in U.S. Pat. No. 6,680,702, "Radio Frequency Resonant Tags with Conducting Patterns Connected Via a Dielectric Film," issued Jan. 20, 2004 to Yde-Andersen et al., herein incorporated by reference. The Yde-Andersen patent describes radio frequency resonant tags wherein radio frequency energy is transmitted through a resonance circuit without the need for direct connection of a conducting pattern or conducting patterns, but rather via a dielectric film which is adjacent to the conducting pattern or separates the conducting patterns. A related system is described in EP 1225585 A1, "CD Comprising a Transponder and a CD-Box Comprising a Resonance Circuit," published Jul. 24, 2002 by Esch and Lucas. In this system, a transponder circuit comprising a relatively large coil and a capacitor is tuned to or near the frequency of an identification and antitheft system such that it is coupled without direct electrical contact, permitting a radio frequency transmitting/receiving system to read information from the identification system over a greater distance than would be possible without the coupled transponder system.

Regarding the embodiments in FIG. 5 and FIG. 6, and related embodiments with one or more removable antennas associated with an RFID tag, the RFID tag may be attached to a container that holds products or other materials, or it may be attached to a product within a container. The removable antenna may be attached to a product itself within a container, or to a container. In one embodiment, both the RFID tag and the removable antenna are attached to a container and not to the product or materials within the container, such that the product or materials within the container may be readily be separated from the RFID tag by a consumer who has purchased the product or by another party. In one embodiment, deactivation of the removable antenna occurs by physically removing the removable antenna from the container to which it is attached without removing the RFID tag from its location on or within the container. In another embodiment, a permanent secondary antenna and a primary removable antenna are both attached to the same container, or to the same product, or to an external surface of an object, or to the same surface or panel of an object.

Figure 7A:
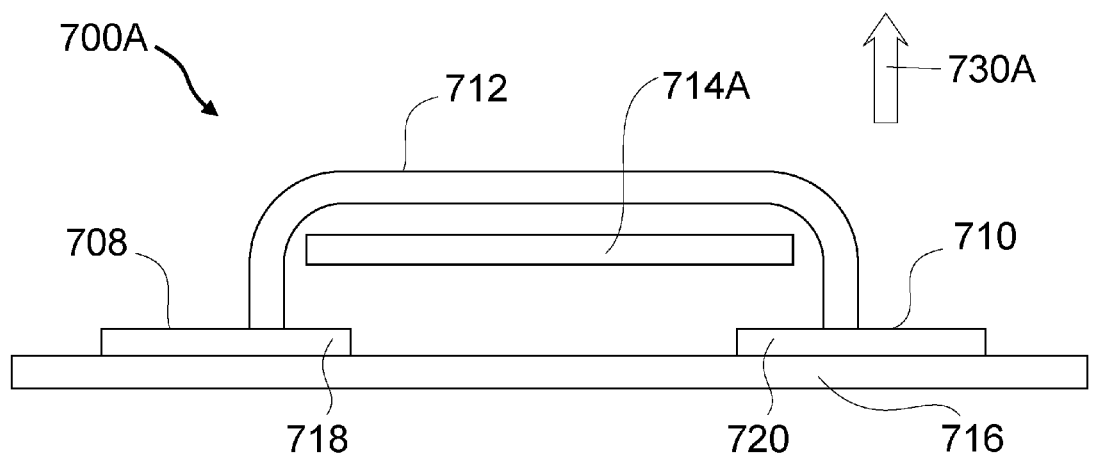
FIG. 7A is a diagram of an exemplary embodiment of a system in which a switch has a solid movable element for activating or deactivating an RFID circuit.

FIG. 7A depicts a switch 700A for activating or deactivating an RFID circuit. In the switch 700A, conductive leads 708, 710 are disposed on a substrate 716 that may comprise plastic, paper, silicon, or other materials. A non-conductive housing 712 encloses a volume within which exposed ends 718, 720, respectively, of the conductive leads 708, 710 reside. The exposed ends 718, 720 are exposed inside to the enclosed volume. The leads communicate electrically with other portions of an RFID circuit that are not shown and may, for example, join the RFID chip to a terminal of an antenna or may join two other components in the RFID circuit. A movable conductive element 714A may, under the influence of a force or acceleration field 730A such as gravity, a magnetic field, centrifugal force, or other forces, be biased toward or away from the exposed ends 718, 720, respectively, of the conductive leads 708, 710. As shown, the movable element 714A is biased away from the leads 708, 710, so the RFID circuit (not shown) comprising the leads 708, 710 is open until the movable element 714A is brought downward into contact with the leads 708, 710 (e.g., via exposed ends 718, 720) to close the circuit. An example of how such a circuit could be used is, for example, a security document such as a passport in which the presence of a magnetic field from a magnet embedded in one cover of a passport biases the movable element 714A in an RFID switch 700A embedded in the opposing cover to open the circuit when the passport is closed and the magnetic element is adjacent to the RFID switch 700A. Opening the passport removes the magnetic field and allows the movable element 714A to fall under the influence of gravity into position to close the circuit and allow the RFID circuit to become active and thus available for scanning. In other words, a security document system comprising the RFID switch 700A and an opposing magnetic element (not shown) keeps the RFID circuit in a deactivated state until the document is opened and positioned in a substantially horizontal, face-up position to permit reading as well as RFID scanning. Similar objectives may be achieved with other switch concepts discussed herein and for many other systems besides security documents, including credit cards.

Figure 7B:
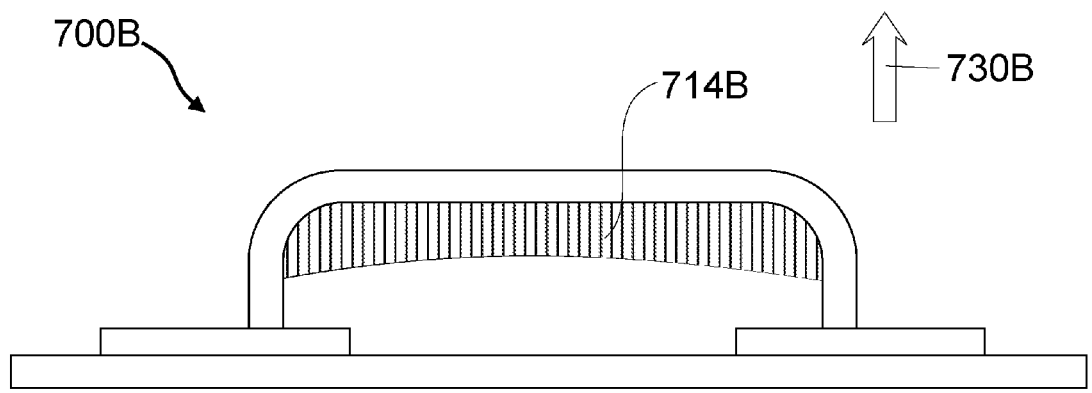
FIG. 7B is a diagram of an exemplary embodiment of a system in which a switch has a flowable movable element for activating or deactivating an RFID circuit.

FIG. 7B depicts a switch 700B for activating or deactivating an RFID circuit, similar to switch 700A of FIG. 7A except that instead of the solid movable element 714A of FIG. 7A, there is now a flowable movable element 714B such as a conductive liquid or suspension depicted in an inverted state under the influence of a field 730B such as a magnetic or gravitation field. The movable element 714B may comprise a liquid metal, a ferrofluid, a suspension of metallic particles or other conducting particles, an ionic liquid, a solution of suitable ionic strength to provide good conductivity, or conductive powder.

Figure 8A:
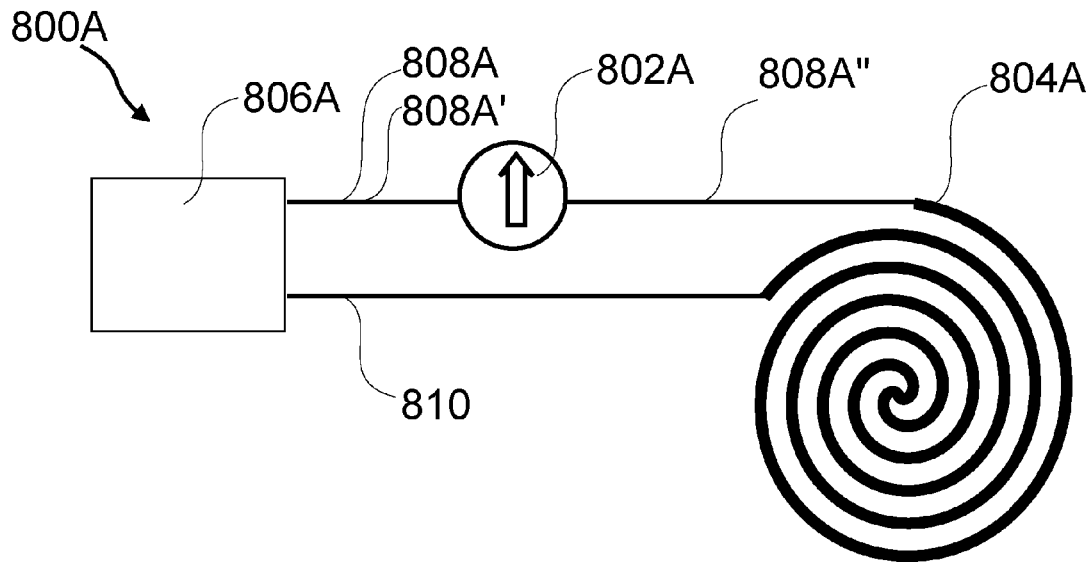
FIG. 8A is a diagram of an exemplary embodiment of a system in which a switchable RFID circuit has an orientation-sensitive switch.

FIG. 8A depicts a switchable RFID circuit 800A comprising an RFID chip 806A, an antenna 804A, conductive leads 808A, 810 joining the chip 806A to an antenna 804A, and an orientation-sensitive switch 802A inserted into the electrical path of an electrical lead 808A between a first portion 808A' and a second portion 808A" of the lead 808A such that the circuit 800A is open or closed depending on the state of the switch 802A. Alternatively, the switch could be inserted between other components of an RFID circuit.

Figure 8B:
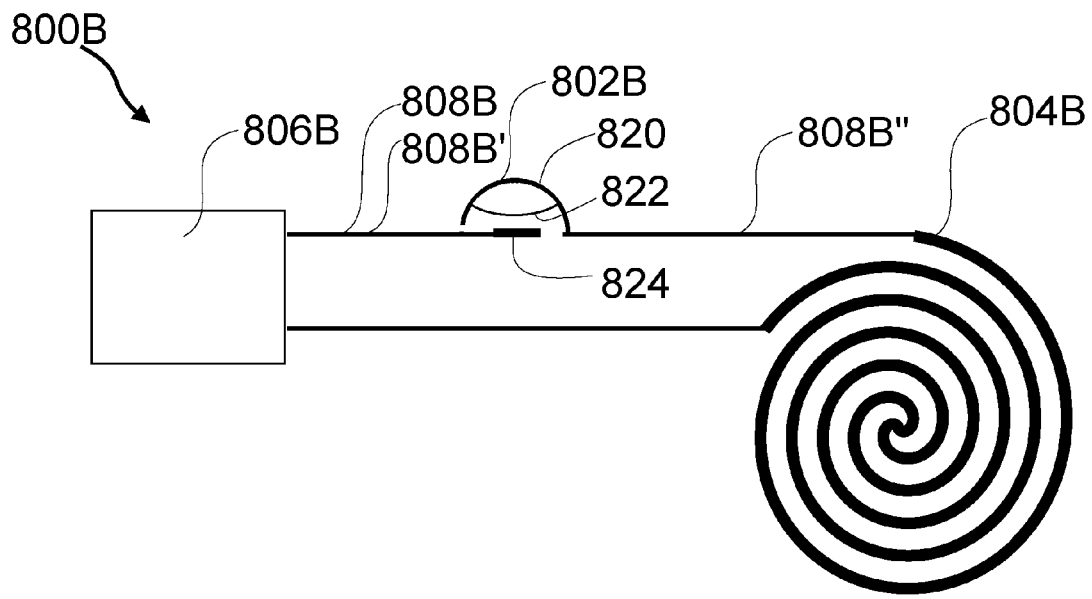
FIG. 8B is a diagram of an exemplary embodiment of a system in which a switchable RFID circuit has a load-sensitive switch.

FIG. 8B depicts a switchable RFID circuit 800B similar to that of FIG. 8A except that a load-sensitive switch 802B is used instead of the orientation-sensitive switch 802A. The switch 802B comprises a resilient body 820 that can be temporarily depressed by a load such as a load applied a human finger, a conductive internal element 822 in electrical communication with the second portion 808B" of lead 808B, such that when the switch 802B is depressed, the conductive internal element 822 is brought into electrical contact with a conductive landing pad 824 that is in electrical communication with the first portion 808B' of the lead 808B to close the circuit and bring the antenna 804B into electrical communication with the RFID chip 806B, thus activating the circuit and enabling external RFID scanning with suitable equipment.

FIGS. 9A and 9B depict a relative orientation-sensitive switch 900 which is sensitive to the relative orientation of a first member 916 to a second member 918, the two members 916, 918 being movably joined by a substantially non-conductive hinge element 920 or other linkage means known in the art. The first and second members 916, 918 are electrically conductive or comprise electrically conductive components. When the switch 900 is in a first orientation, as shown in FIG. 9A, the first and second members 916, 918 do not communicate electrically, but when the switch is in a second orientation as shown in FIG. 9B, the second member 918 contacts the first 916 and establishes a zone of electrical contact 922. By placing such a switch into an RFID circuit (not shown), the RFID circuit may be inactive until the relative orientation of two components of an article (not shown) are in a predetermined state required to establish electrical contact. For example, such a switch 900 may be placed within the spine of a passport (not shown), such that an RFID circuit is inactive until the first cover is moved away from the second cover (not shown) to move the members of the switch to form electrical contact and activate the RFID circuit. Alternatively or in addition, such a switch 900 forms a part or is added to a portion of a pair of RFID-enabled safety glasses (not shown) such that an RFID circuit in the safety glasses is active or inactive depending on whether the glasses are in a folded position, are being worn, or are otherwise opened. Safety glasses with a relative orientation-sensitive switch in an RFID circuit may be part of an RFID-enabled compliance system for personal protective equipment, such as the system described in U.S. Pat. No. 6,853,303, issued Feb. 8, 2005 to Chen et al., hereby incorporated by reference in its entirety.

Another example of a product according to the present invention is shown in FIG. 10, where a face mask 1000 is depicted with a load-sensitive RFID circuit 1040. The face mask 1000 has an exterior surface 1010 and an interior surface 1020 intended to be fitted over the nose and mouth to filter air. An elastic strap 1030 is shown, which may be placed around the head to hold the mask 1000 securely in place. Two or more straps (not shown) may also be used, or ear loops, temples, or other means for attaching the mask to the head may be used (not shown), as known in the art and depicted, for example, in U.S. Pat. No. 5,561,863, U.S. Pat. No. 5,596,985, U.S. Pat. No. 5,220,699, or U.S. Pat. No. 6,336,456.

The strap 1030 is attached at the sides of the face mask to attachment zones 1036, 1038. At least one of the attachment zones (e.g., 1036 in FIG. 10) comprises the tension-sensitive RFID circuit 1040. As shown in an expanded view 1050 from the attachment zone 1036, the RFID circuit 1040 is responsive to an environmental factor in the form of external tension 1060 applied to the elastic strap 1030. A tension-sensitive switch in effect is formed by a movable conductive terminal 1024 attached to an end of the strap 1030 and joined to a terminal of the antenna 1004 by a flexible connection 1008 (or, alternatively, other electrical components in the RFID circuit 1040). When tension 1060 is applied to the strap 1030, the conductive terminal 1024 may be moved into electrical contact with a conductive strip 1022 that is in electrical communication with the RFID chip 1006 (or, alternatively, another portion of the RFID circuit 1040 such as a power supply line in an active RFID tag) such that the RFID circuit 1040 becomes active (e.g., capable of generating a readable signal when powered by a suitable RF signal from an RFID scanner or, for active tags, from a power source such as a battery).

In the system of Chen et al. in U.S. Pat. No. 6,853,303, the safety system disclosed therein may be enhanced with the devices of the present invention. RFID scanners at access points requiring use of personal protective equipment can identify when personnel are improperly wearing articles. For example, using personal protective apparel with RFID tags comprising circuits with switches that are orientation or relative-orientation sensitive, an RFID portal will fail to read a mandatory RFID tag if safety glasses are folded in a pocket, or if a face mask is not worn. The RFID scanner may also be adapted to determine the approximate vertical position of required safety objects as a person attempts to pass through an access point to an area where personal protective equipment must be worn. Using triangulation or other means, RFID scanners may determine, for example, that the face mask being carried by a user is lower than the RFID-labeled collar of a protective jacket, indicating that the glasses probably are not being worn. Thus, height detection may be used to further augment a compliance system.

In another aspect of the invention (not shown), an RFID circuit sensitive to an environmental condition is used to enhance the value of personal protective equipment such as face masks, gloves, protective jackets or gowns, goggles or eyeglasses, helmets, safety shoes, and the like, in combination with RFID scanners that detect not only whether a worker is carrying the necessary protective equipment or apparel for a task, but also whether the equipment is being worn or at least is in a state similar to that of being worn. Thus, load sensors, orientation sensors, and the like integrated into RFID circuits may turn a circuit on or off depending on the deployment of the articles in question.

Further Embodiments to Reduce the Threat of Unwanted RFID Scanning

The switch-related RFID systems in aspects of the present invention help reduce the risk of criminals or others using hidden RFID scanners to obtain the identification number or other sensitive information from an RFID-enabled device (e.g., a device with an RFID chip and antenna intended to be readable under certain conditions). Improper scanning poses the threat that others may mimic the owner or gain improper access to the owner's accounts or obtain other information not desired to be shared.

Figure 11:
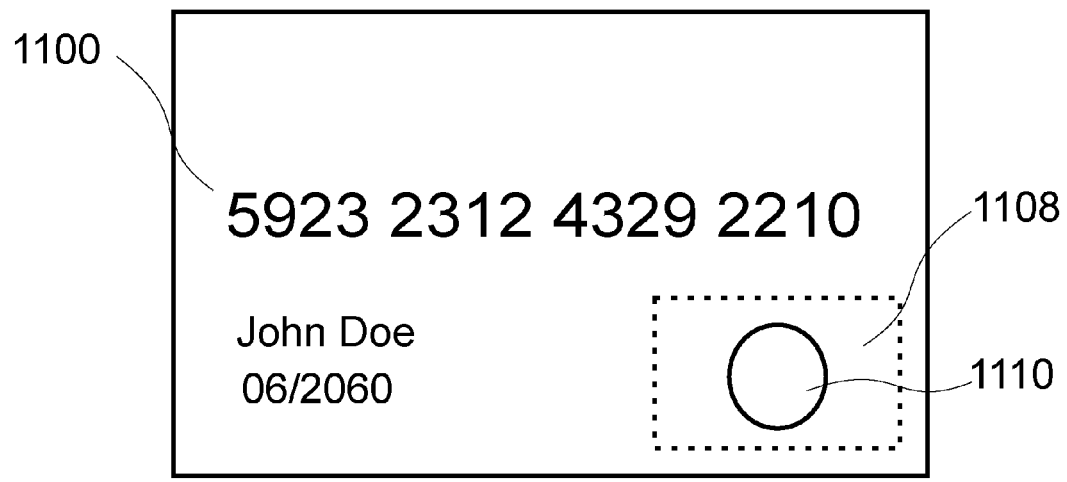
FIG. 11 is a diagram of an exemplary embodiment of a system in which a credit card has an embedded RFID circuit that is not active until the user selectively depresses a region on the card to temporarily activate the card.

FIG. 11 depicts a credit card 1100 with an embedded RFID circuit 1108 (shown in phantom) that is not active until the user selectively depresses a region 1110 on the card 1100 to temporarily activate the card. The marked region 1100 may be part of or include a load-sensitive switch or other switches or sensors sensitive to touch to activate an internal electrical signal. The switch need not be mechanical, but can be electrically powered with an internal battery or by RF energy harvested to provide a switch that is touch sensitive by means of sensing heat transfer (e.g., warmth of a finger, changes in thermal conductivity, differential heat transfer, etc.), or by sensing the change in electrical environment (e.g., conductivity, inductance, capacitance, etc.) due to the presence of human skin, etc. Only when the region 1110 is being touched is the RFID circuit capable of being scanned.

Figure 12:
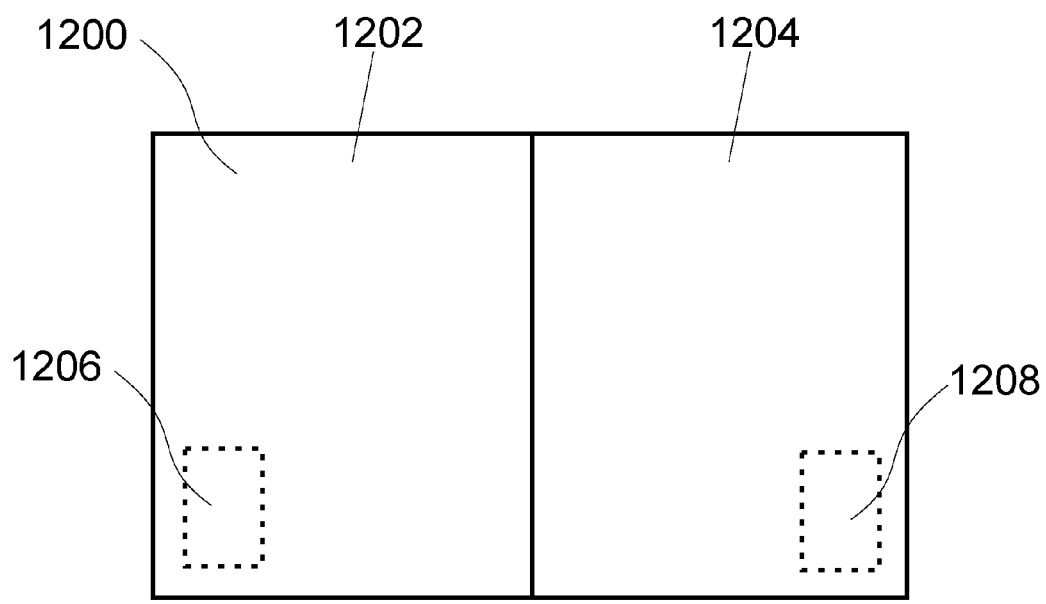
FIG. 12 is a diagram of an exemplary embodiment of a system in which a foldable article has an embedded RFID circuit and opposing element for opening and closing the RFID circuit.

FIG. 12 depicts a foldable article 1200 such as a passport having a first portion 1202 (e.g., a front cover) and a second portion 1204 (e.g., a back cover) that may be folded together or opened, as shown. An RFID circuit 1208 (shown in phantom) is embedded in the second portion 1204, and its operability is responsive to the presence or absence of an embedded element 1206 (shown in phantom) in the opposing first portion 1202. The embedded element 1206 may be a magnetic strip, for example, that can deactivate the RFID circuit 1208 employing, for example, devices of the nature shown in FIGS. 7A and 7B. When the article 1200 is folded, the RFID circuit 1208 may be deactivated and not available for routine scanning, thus reducing the risk of unauthorized parties covertly scanning information in the RFID chip (not shown) of the RFID circuit 1208.

Figure 13:
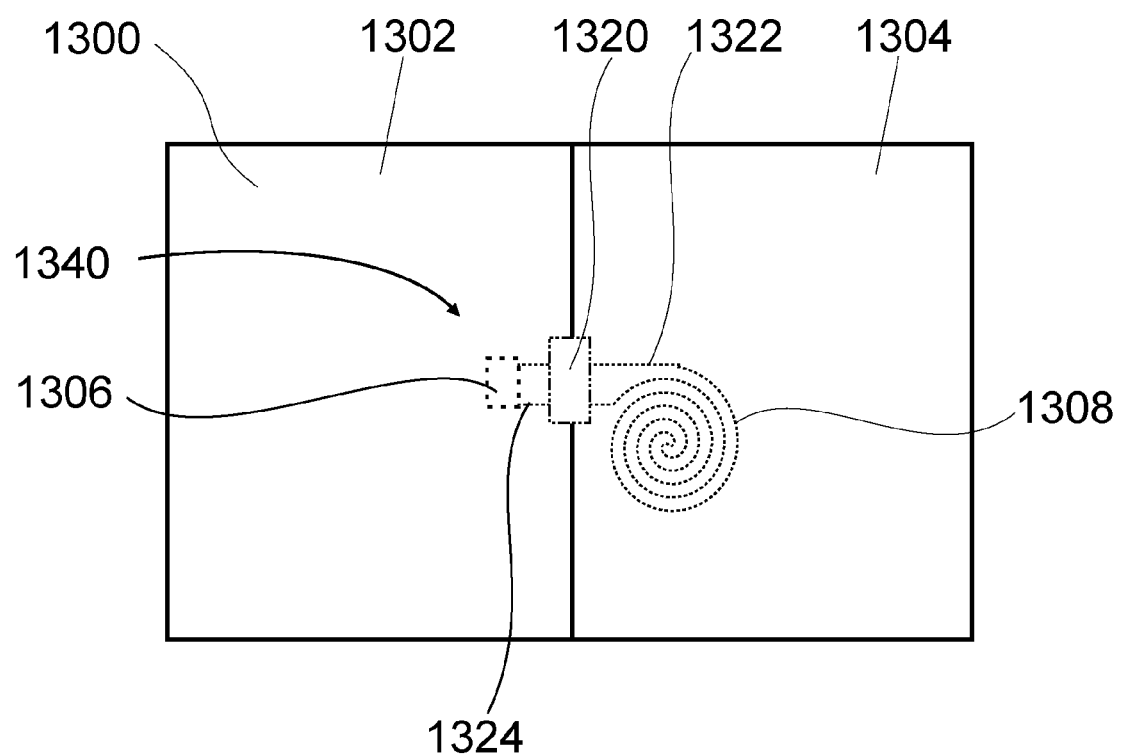
FIG. 13 is a diagram of an exemplary embodiment of a system in which a foldable article has a relative-orientation sensitive switch for enabling and disabling an RFID circuit.

FIG. 13 shows another version of a foldable article 1300 having a first portion 1302 and a second portion 1304 that may be folded relative to one another. The article 1300 comprises an attached or embedded RFID circuit 1340 comprising an RFID chip (data circuit) 1306 (shown in phantom), conductive leads 1322 and 1324 (both shown in phantom) joining the RFID chip 1306 to an antenna 1308 (shown in phantom) and a relative-orientation sensitive switch 1320 (shown in phantom) disposed along at least one of the conductive leads 1322 and 1324, such that the on/off state of the switch 1320 determines whether the RFID circuit 1340 is active or inactive. For example, when the foldable article 1300 is open, as shown, the switch 1320 is closed, thus activating the circuit 1340 and permitting RFID scanning to occur. When the article 1300 is folded, the switch 1320 is open and the RFID circuit 1340 deactivated. In this manner, for example, a passport in the pocket of a user may be made difficult to scan by unauthorized parties, but when it is opened by the user in a secure setting, automatic scanning could occur.

In a related embodiment, RFID-enabled systems are protected from hacking attacks through the use of two or more RFID chips in a secure device to provide means for broadcasting one or more bogus codes subject to remote scanning in a hacking attack, with the actual RFID code only being accessible for scanning when the owner executes a predetermined action that enables access (e.g., switches on access) to the true RFID code and optionally turns off broadcasting of the bogus code.

In another version (not shown), a secure RFID-enabled device comprises two RFID chips in communication with a circuit that toggles which chip may be read by an RFID scanner (e.g., using a system similar to that of the tamper-evident container with two RFID tags in FIG. 4). The circuit by default may put a chip with a "bogus" identification code into communication with an antenna, but when the user executes a switching action, the other RFID chip with the true or real or non-bogus identification code becomes active. The switching action may comprise depressing a button on a smart card or other substrate that mechanically or otherwise closes a connection to electronically activate the RFID chip with the true identification code. The switching action may also comprise physically sliding or transposing a member that may comprise, for example, an antenna, such that the element enables wireless communication with the RFID chip containing the true identification code, while deactivating wireless communication with the other RFID chip. The element may slide in a track and may comprise metallic contacts that may slide into contact with either of two or more regions to close circuits with either of two or more RFID chips, one of which transmits the true identification code, thus allowing the user to activate reading of the true identification code on demand.

In another version, an RFID tag for transmitting the true identification code (or a critical part thereof such as the antenna) is effectively shielded from RFID scanning by a material such as a metal foil or metallic casing that may be selectively and temporarily removed by the user on demand. For example, an RFID tag may be slidably disposed in a small container such as cylinder or vial comprising a shielded zone and an unshielded zone. Under normal conditions, the RFID tag or critical part thereof may reside in the shielded portion of the container, but in response to an action by the owner, the tag may slide or otherwise be moved to the unshielded portion of the container, where it may be read. In an embodiment, motion of the RFID tag is driven by gravity, and the action of the user to invert the container (e.g., turning a smart card or passport upside down or shaking it in a predetermined manner) creates forces that drive the RFID tag into the unshielded region. After being read, the user reverses the process to shield the tag, or the tag may be adapted to naturally return to its shielded location. For example, a spring, elastic thread, magnet, or other means may bias the tag into the shielded region of its container after the user has created a force or other driving means to temporarily bring the tag to an unshielded location. For example, an RFID-enabled passport may not be readable, or may only provide a bogus identification code, except for a brief moment when the owner inverts and/or shakes the passport in a particular manner that allows the RFID tag to move outside the shielded region to support RFID scanning from a nearby authorized RFID scanner. Upon cessation of the shaking and/or inversion, the tag may quickly return to its shielded location. Thus, a "shake and read" or "flip and read" system may be implemented. The security regions for authorized reads may be secured from unauthorized scanning by security forces watching for unauthorized radio signals. RFID readers at such installations may also monitor the presence of additional readers and provide a signal indicating that the conditions are safe for users to momentarily activate scanning of their true identification codes.

In an embodiment, a secondary antenna is proximate to a primary antenna for effective scanning to occur, and the secondary antenna may be selectively removed or relocated by the user. For example, the secondary antenna may be slidable relative to the other components of the RFID circuit, such that when it is remote, scanning is difficult (e.g., the read range is greatly reduced for a given RFID scanner). The sliding of the secondary antenna may be driven by gravity, making the device orientation sensitive. Alternatively or in addition, the user may slide a component with the fingers into place, or the secondary antenna may be contained in an element such as a passport cover or separate card that is brought into proximity with the RFID-tag containing component for RFID scanning to be fully enabled.

Any of the devices or systems within the scope of aspects of the invention may be employed with a wide variety of RFID technologies. For example, the use of multidirectional RFID antennas or non-planar RFID tags is within the scope of the present invention. Examples of multidirectional antennas are discussed in U.S. Pat. No. 6,069,564, "Multi-directional RFID Antenna," issued to Hatano and Monahan, May 30, 2000, hereby incorporated by reference.

For other RFID designs and systems, see U.S. Pat. No. 5,939,984, "Combination Radio Frequency Transponder (RF Tag) and Magnetic Electronic Article Surveillance (EAS) Material," issued Aug. 8, 1999; U.S. Pat. No. 6,118,379, "Radio Frequency Identification Transponder Having a Spiral Antenna," issued Sep. 12, 2000; U.S. Pat. No. 6,215,402, "Radio Frequency Identification Transponder Employing Patch Antenna," issued Apr. 10, 2001; and U.S. Pat. No. 6,867,983, "Radio Frequency Identification Device and Method," issued Mar. 15, 2005.

In one form, a system reduces the risk of unwanted scanning of an article with an RFID circuit. The RFID circuit comprises a data circuit including an RFID chip, an antenna for receiving and emitting radio frequency signals from an external RFID scanner, a connection joining the antenna and the RFID chip, and an environmentally sensitive switch in communication with at least one part of the RFID circuit. The communication is such that the RFID scanning of the RFID circuit is substantially disabled when the state of the switch is off. The RFID circuit is substantially enabled when the state of the switch is on. The state of the switch is determined by an environmental factor that may be selectively controlled by a user.

The switch may be a mechanical switch responsive to applied pressure or to orientation relative to the vertical axis. The switch may be a touch sensitive switch that is turned on by contact with skin. The switch may include a photosensitive switch that is turned on by the presence of light having predetermined characteristics. The switch may be responsive to a sensor that is selected from one or more of the following: a load sensor, a temperature sensor, a humidity sensor, a light sensor, a contact sensor, and an orientation sensor. The mechanical switch may comprise a micro electro mechanical system device having a gravity-sensitive circuit. The article may comprise a first member, and a second member that may be moved relative to the first member between at least two different relative orientation states. The switch is responsive to the relative orientation state of the first and second members. In an embodiment, the article is foldable.

In an embodiment, the switch is in a first region of the article. The switch is responsive to the proximity of an element in a second region of the article. The second region is foldably movable relative to the first region.

In another form, an article has a radio frequency identification (RFID) tag attached thereto. The RFID tag comprises personal data related to a user. The tag is responsive to an environmental condition. The RFID tag comprises an RFID chip for storing an RFID code, an antenna for communicating a radio frequency (RF) signal, and a switch coupling the RFID chip to the antenna. The environmental condition closes the mechanical switch to enable the RFID chip and the antenna to communicate the RFID code via the RF signal. In an embodiment, the package comprises paperboard or corrugated board. In an embodiment, the switch is normally off but may be temporarily activated upon demand by an action of the user to modify the environmental condition.

In yet another form, a personal protective article comprises an RFID tag in an RFID circuit. The RFID circuit comprises a switch responsive to an environmental condition related to the manner in which the article is used such that the RFID tag is activated when the article is being worn properly. The RFID tag may be deactivated when the article is in a configuration indicative of improper use.

In an embodiment, the switch is selected from a load-sensitive switch, an orientation-sensitive switch, a relative orientation sensitive switch, a switch sensitive to the presence of a magnetic field, and a light-sensitive switch.

In still another form, a face mask comprises a filtration section, attachment means connected to the filtration section, and an RFID tag attached to at least one of the filtration section and attachment means. The RFID tag has an RFID circuit with a tension-sensitive switch. The RFID circuit is open by default but may be closed by application of suitable force applied to the attachment means.

Remarks

According to the present invention, two or more RFID chips may be associated with a product, and these chips may be associated with one or more antennas, including a removable antenna which may be associated with one or more of the chips.

In another embodiment, the purchaser selectively deactivates a permanent RFID tag that remains with the product to temporarily prevent scanning. For example, a switch that is closed by default, providing an active RFID circuit, could be opened by application of pressure or flipping a toggle switch to open the circuit and prevent scanning.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. An article having an RFID circuit, the RFID circuit comprising:
   an RFID chip;
   an antenna configured to communicate with an RFID scanner via radio frequency signals;
   a connection joining the antenna and the RFID chip; and
   an environmentally sensitive switch in communication with the RFID chip, wherein an environmental factor selectively controlled by a user is configured to change the switch between a first state and a second state different than the first state, and wherein the switch comprises a first member and a second member movable relative to the first member between at least two different relative orientation states, and wherein the switch is responsive to the relative orientation state of the first and second members, and further wherein scanning of the RFID circuit is substantially disabled when the switch is in the first state, and enabled when the switch is in the second state.

2. The article of claim 1, wherein the switch is a mechanical switch responsive to applied pressure.

3. The article of claim 1, wherein the switch comprises one or more of the following: a load sensor, a temperature sensor, a humidity sensor, a contact sensor, and an orientation sensor.

4. The article of claim 1, wherein the switch comprises a micro electro mechanical system (MEMS) device having a gravity-sensitive circuit.

5. The article of claim 1, wherein the article is foldable.

6. The article of claim 1 wherein the article comprises a passport.

7. An article having an RFID circuit, the RFID circuit comprising:
   an RFID chip;
   an antenna configured to communicate with an RFID scanner via radio frequency signals;
   a connection joining the antenna and the RFID chip; and
   an environmentally sensitive switch in communication with the RFID chip, wherein the switch is a touch sensitive switch responsive to contact with skin to change the switch between a first state and a second state different than the first state, and wherein scanning of the RFID circuit is substantially disabled when the switch is in the first state, and enabled when the switch is in the second state.

8. An article having a radio frequency identification (RFID) tag attached thereto, the RFID tag comprising personal data related to a user, the RFID tag being responsive to an environmental condition, the RFID tag comprising:
an RFID chip configured to store an RFID code;
an antenna configured to communicate a radio frequency (RF) signal; and
a switch coupling the RFID chip to the antenna, wherein the environmental condition closes the switch to enable the RFID chip and the antenna to communicate the RFID code via the RF signal, wherein the switch is in a first region of the article, and wherein the switch is responsive to the proximity of an element in a second region of the article, the second region being foldably movable relative to the first region.

9. The article of claim 8, wherein the article comprises a package including paperboard or corrugated board.

10. The article of claim 8, wherein the switch is normally off but can be temporarily activated upon demand by an action of the user to modify the environmental condition.

11. A personal protective article, comprising:
an RFID tag in an RFID circuit, wherein the RFID circuit comprises a switch responsive to a condition related to a manner in which the article is worn by a user, the switch comprising a first member movable relative to a second member between at least two different relative orientation states, and wherein the switch is responsive to the relative orientation state of the first and second members;
wherein when the article is worn in a proper orientation the switch is on and the RFID tag is activated, and when the article is worn in an improper orientation or not worn, the switch is off and the RFID tag is deactivated.

12. The personal protective article of claim 11 wherein the article comprises safety glasses.

13. A face mask, comprising:
a filtration section;
means for attaching the face mask to a user; and
an RFID tag coupled to at least one of the filtration section or the means for attaching, the RFID tag having an RFID circuit with a tension-sensitive switch, wherein the switch is configured to move from an open state to a closed state upon application of a suitable force applied to the means for attaching, and wherein the switch comprises a movable conductive terminal coupled to the means for attaching;
an antenna configured to communicate radio frequency signals with an external RFID scanner; and
a flexible connection joining the antenna and the conductive terminal.

14. The face mask of claim 13, wherein:
the face mask includes a first side and a second side spaced apart from the first side; and
the means for attaching comprises an elastic strap having a first end coupled to a first attachment zone at the first side of the face mask and a second end coupled to a second attachment zone at the second side of the face mask, and wherein at least one of the first attachment zone and the second attachment zone includes the tension-sensitive switch.

* * * * *